United States Patent
Nakajima

(10) Patent No.: US 7,736,257 B2
(45) Date of Patent: *Jun. 15, 2010

(54) DIFFERENTIAL GEAR APPARATUS FOR VEHICLE

(75) Inventor: Shinichiro Nakajima, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 146 days.

This patent is subject to a terminal disclaimer.

(21) Appl. No.: 11/571,683

(22) PCT Filed: Jul. 8, 2005

(86) PCT No.: PCT/JP2005/012659

§ 371 (c)(1),
(2), (4) Date: Jan. 5, 2007

(87) PCT Pub. No.: WO2006/006524

PCT Pub. Date: Jan. 19, 2006

(65) Prior Publication Data

US 2008/0004151 A1    Jan. 3, 2008

(30) Foreign Application Priority Data

Jul. 9, 2004  (JP) .............................. 2004-203927
Jun. 17, 2005  (JP) .............................. 2005-178578

(51) Int. Cl.
*F16H 48/06* (2006.01)

(52) U.S. Cl. ...................................... 475/230

(58) Field of Classification Search ................. 475/220, 475/230, 248, 344
See application file for complete search history.

(56) References Cited

U.S. PATENT DOCUMENTS

| 6,840,883 | B2 * | 1/2005 | Orr et al. ..................... 475/230 |
| 6,935,981 | B2 | 8/2005 | Nishiji |
| 7,097,585 | B2 | 8/2006 | Nishiji |
| 7,306,537 | B2 * | 12/2007 | Nakajima .................... 475/230 |
| 2004/0214683 | A1 | 10/2004 | Yoshiyama et al. |
| 2005/0049104 | A1 * | 3/2005 | Atkinson et al. ............ 475/230 |
| 2005/0090356 | A1 | 4/2005 | Nakajima et al. |
| 2005/0090359 | A1 | 4/2005 | Kai et al. |

(Continued)

FOREIGN PATENT DOCUMENTS

FR    2 609 135    7/1988

(Continued)

OTHER PUBLICATIONS

U.S. Appl. No. 11/551,521, filed Oct. 20, 2006, Nakajima.

(Continued)

*Primary Examiner*—Roger L Pang
*Assistant Examiner*—Erin D Bishop
(74) *Attorney, Agent, or Firm*—Oblon, Spivak, McClelland, Maier & Neustadt, L.L.P.

(57) ABSTRACT

Pinion gears are rotatably carried within pinion gear receiving openings formed in a differential case. The inner pinion gear holding surfaces of the receiving openings are enlarged inwardly to form extensions to hold not only portions of the pinion gears that are located outwardly and that are to be held, but also part of inner meshing portions of the pinion gears that are disposed in meshing engagement with side gears in an overlapping manner. This construction prevents a tilting of the pinion gears and improves the durability.

13 Claims, 30 Drawing Sheets

U.S. PATENT DOCUMENTS

2006/0287155 A1    12/2006    Nakajima
2006/0287156 A1    12/2006    Nakajima
2008/0051245 A1*    2/2008    Nakajima et al. ........... 475/230

FOREIGN PATENT DOCUMENTS

| | | |
|---|---|---|
| GB | 1246342 | 9/1971 |
| JP | 42 18085 | 9/1967 |
| JP | 47 35557 | 11/1972 |
| JP | 57 129949 | 8/1982 |
| JP | 57-129949 | 8/1982 |
| JP | 4 132245 | 12/1992 |
| JP | 11 82680 | 3/1999 |

OTHER PUBLICATIONS

U.S. Appl. No. 11/845,443, filed Aug. 27, 2007, Nakajima et al.
U.S. Appl. No. 12/262,688, filed Oct. 31, 2008, Nakajima.

* cited by examiner

[FIG. 1]
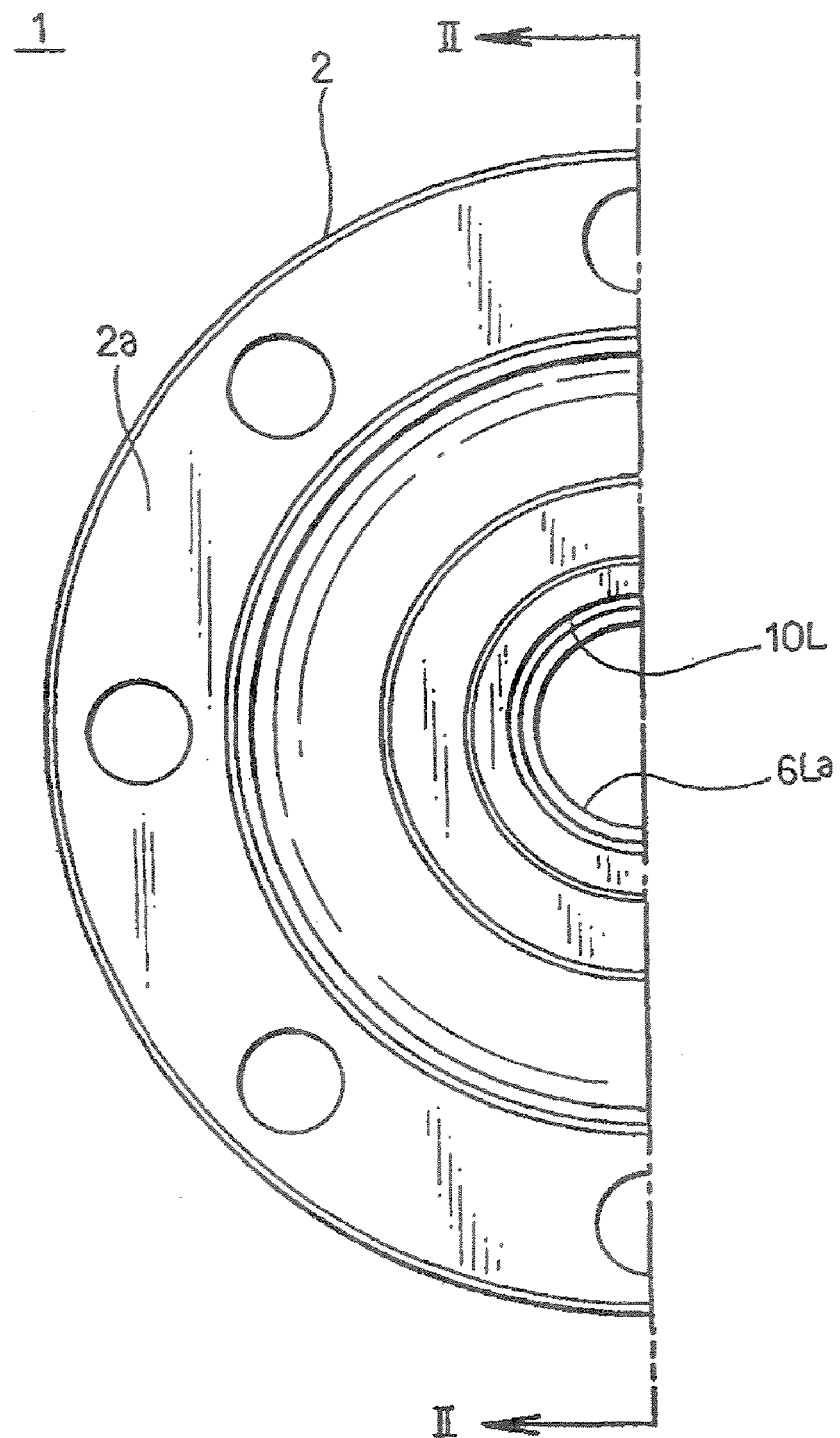

[FIG. 2]
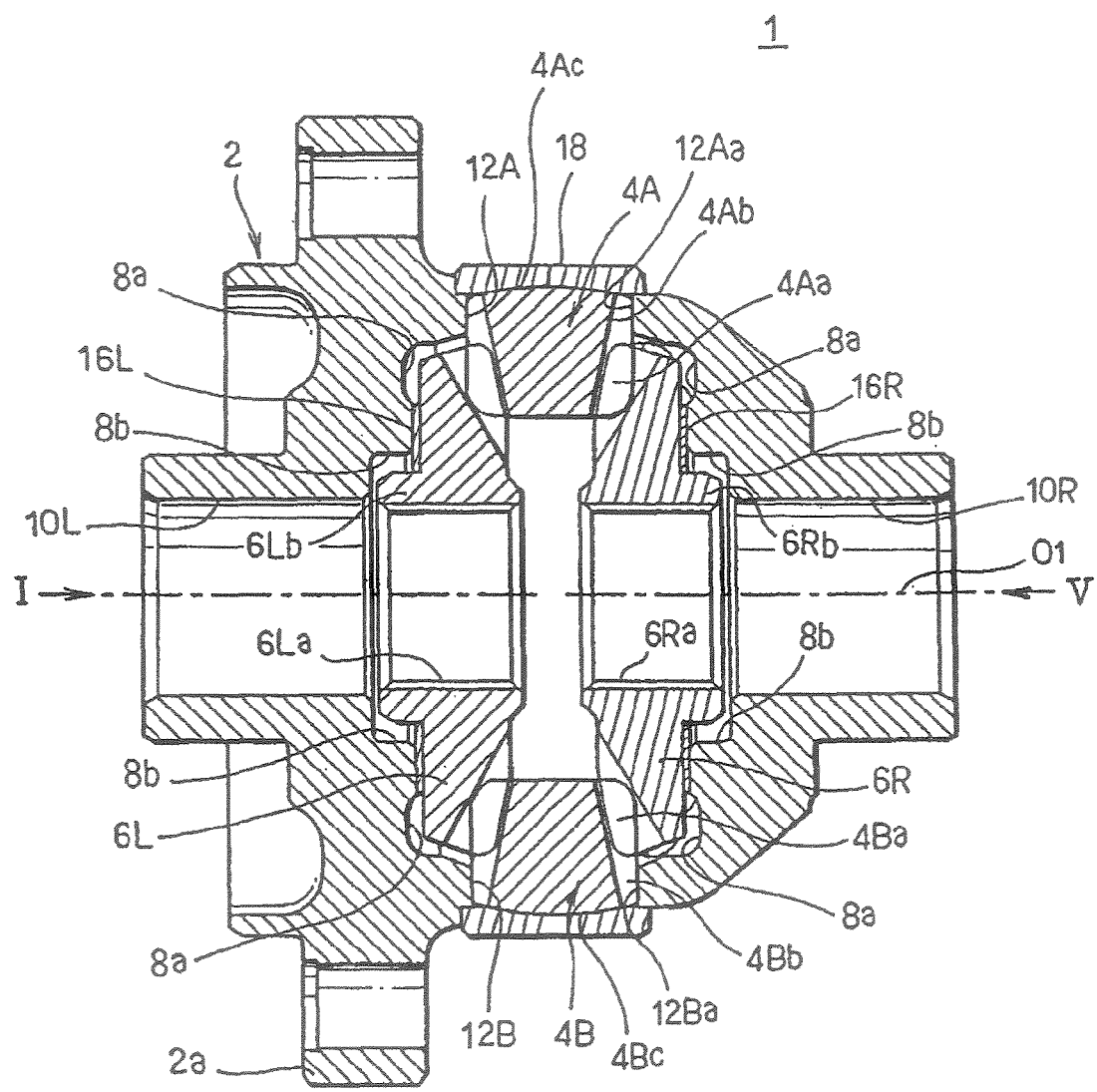

[FIG. 3]
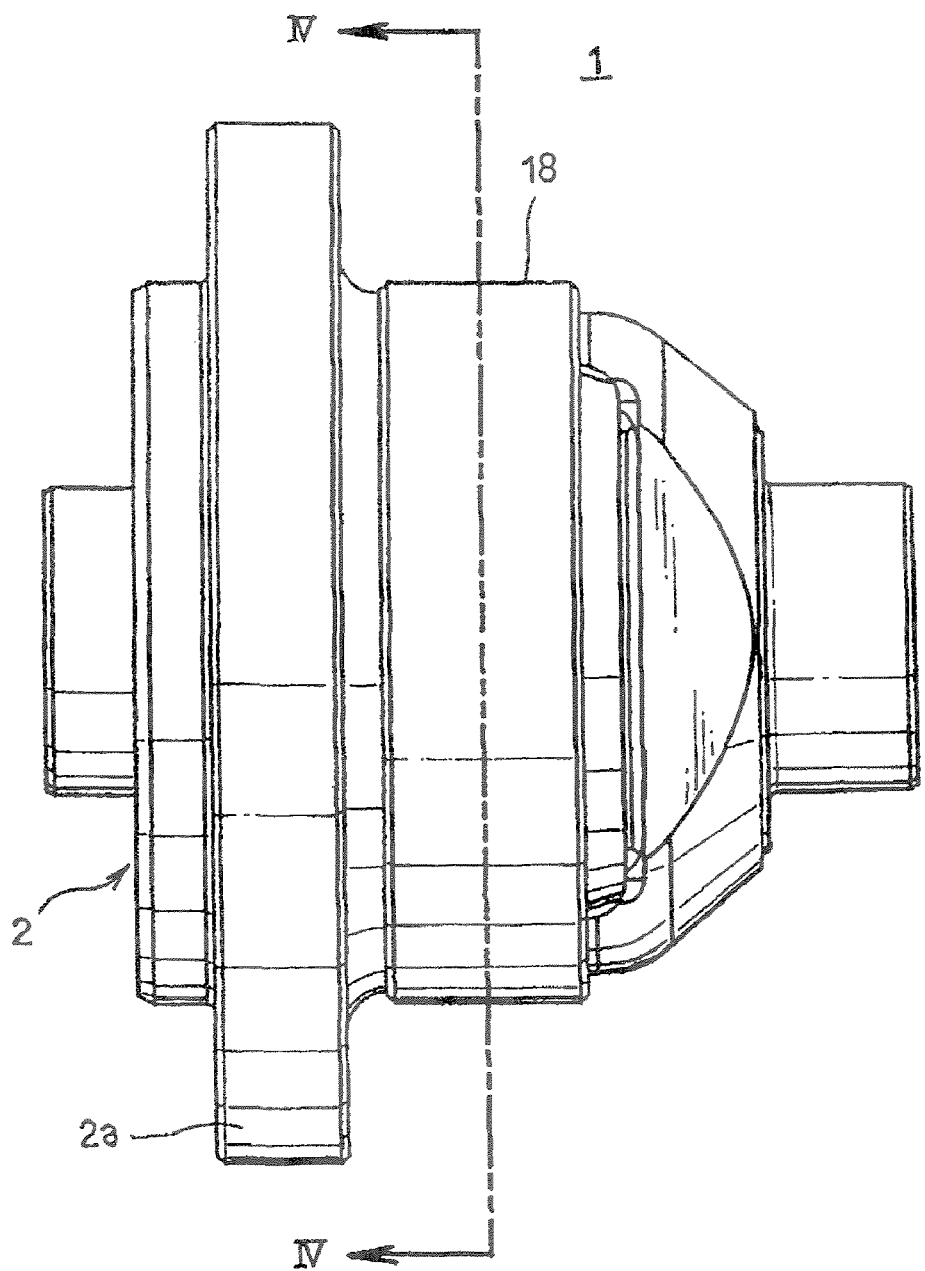

[FIG. 4]
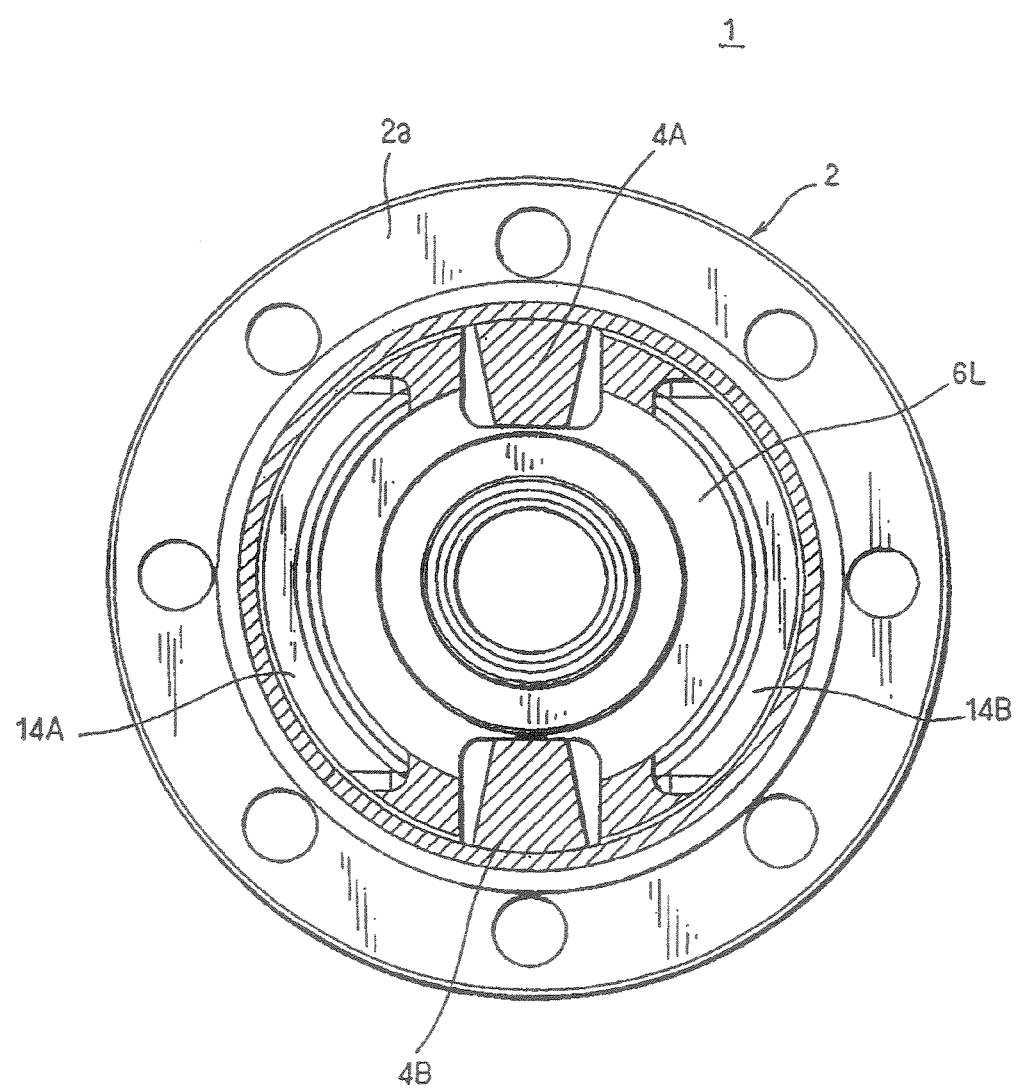

[FIG. 5]
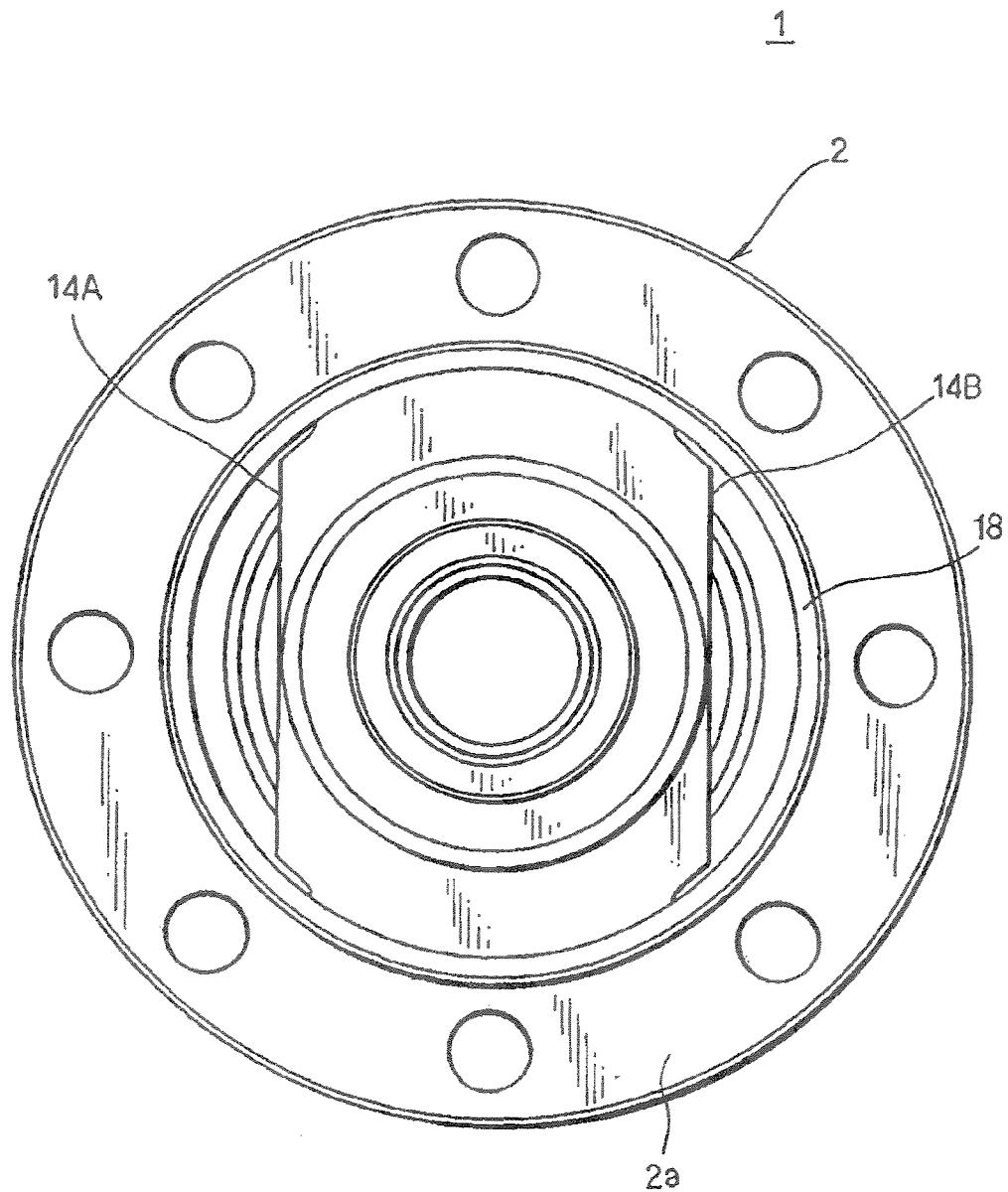

[FIG. 6]
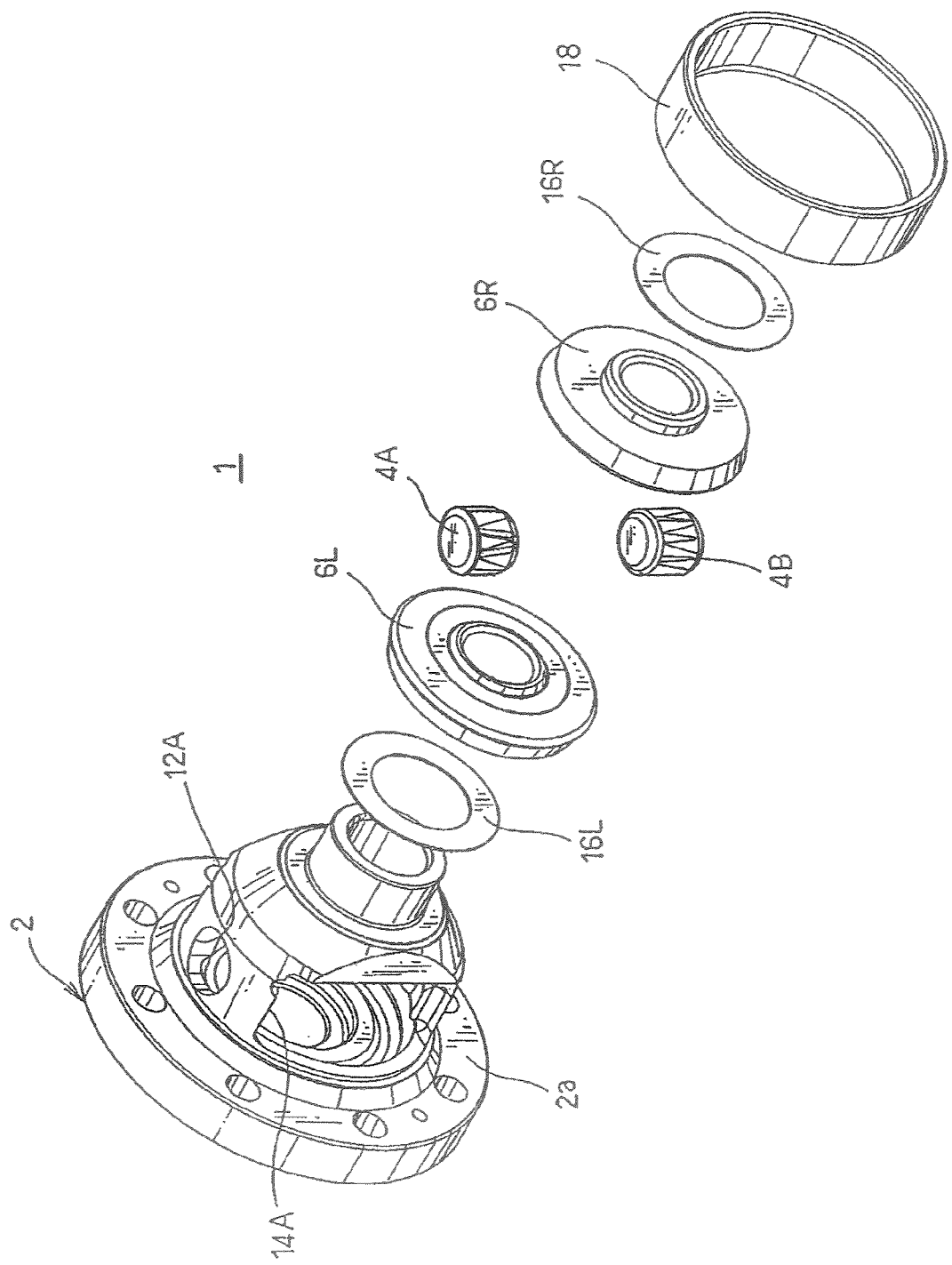

[FIG. 7]
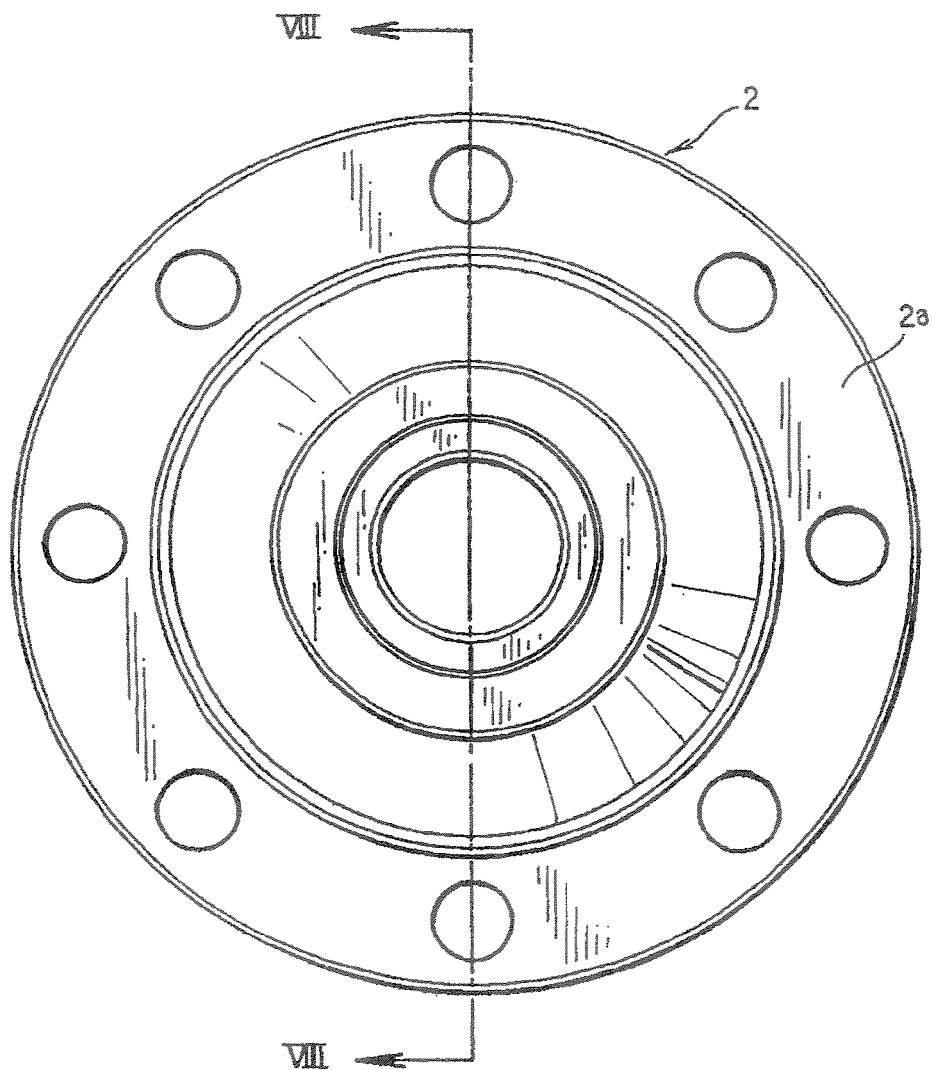

[FIG. 8]
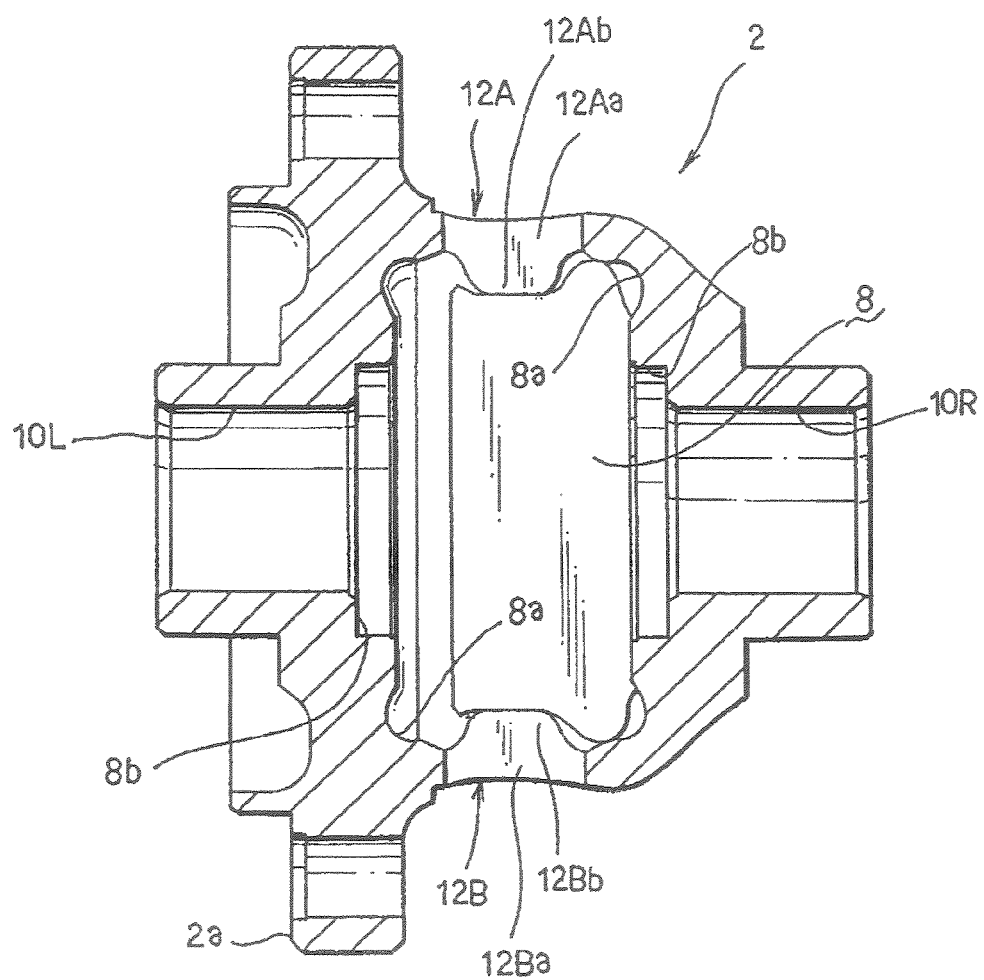

[FIG. 9]
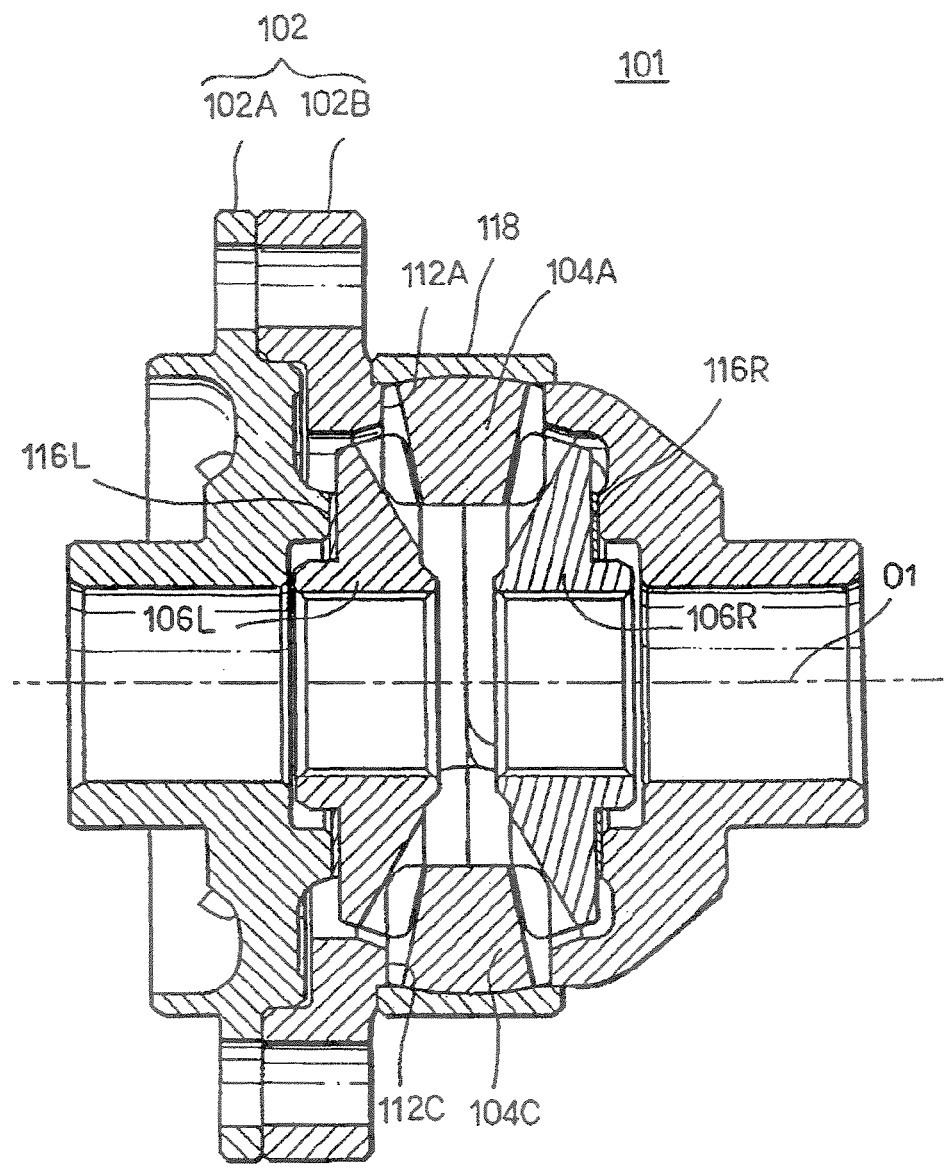

[FIG. 10]
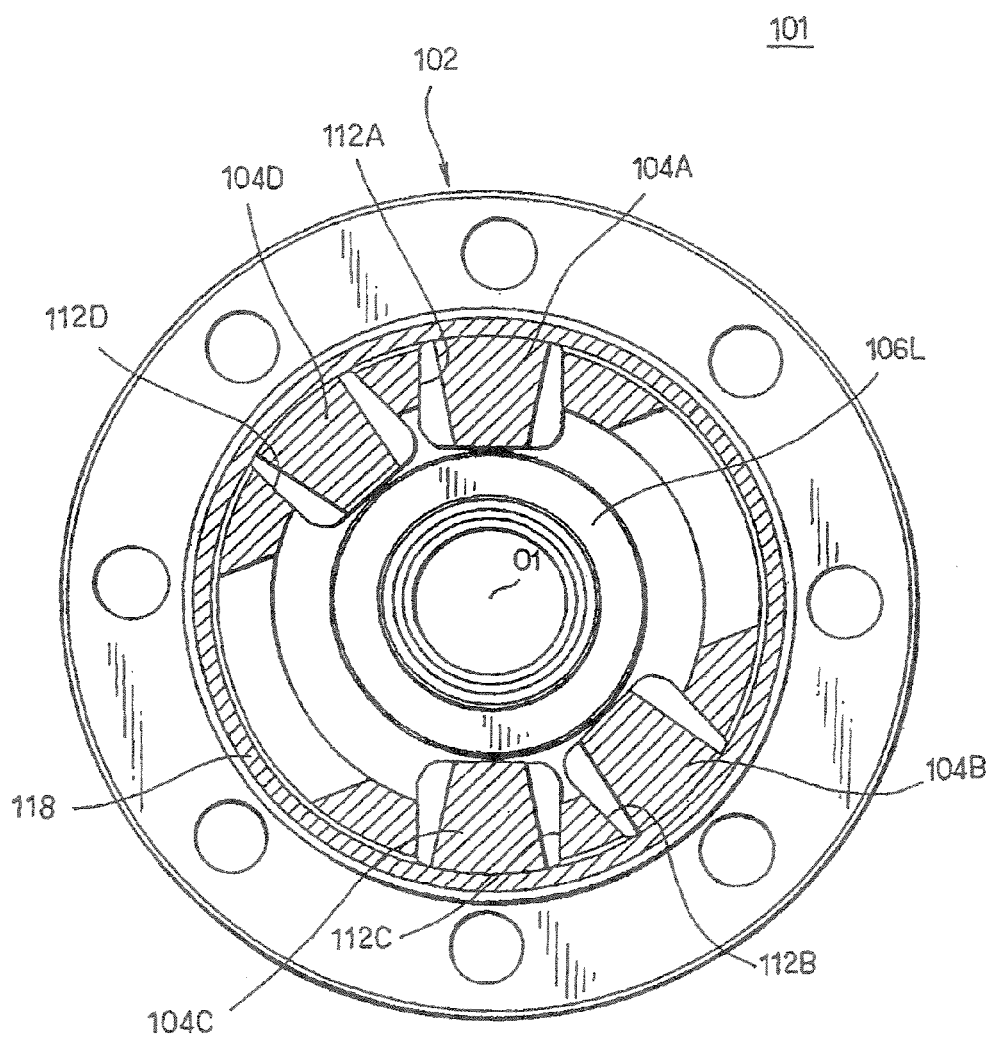

[FIG. 11]
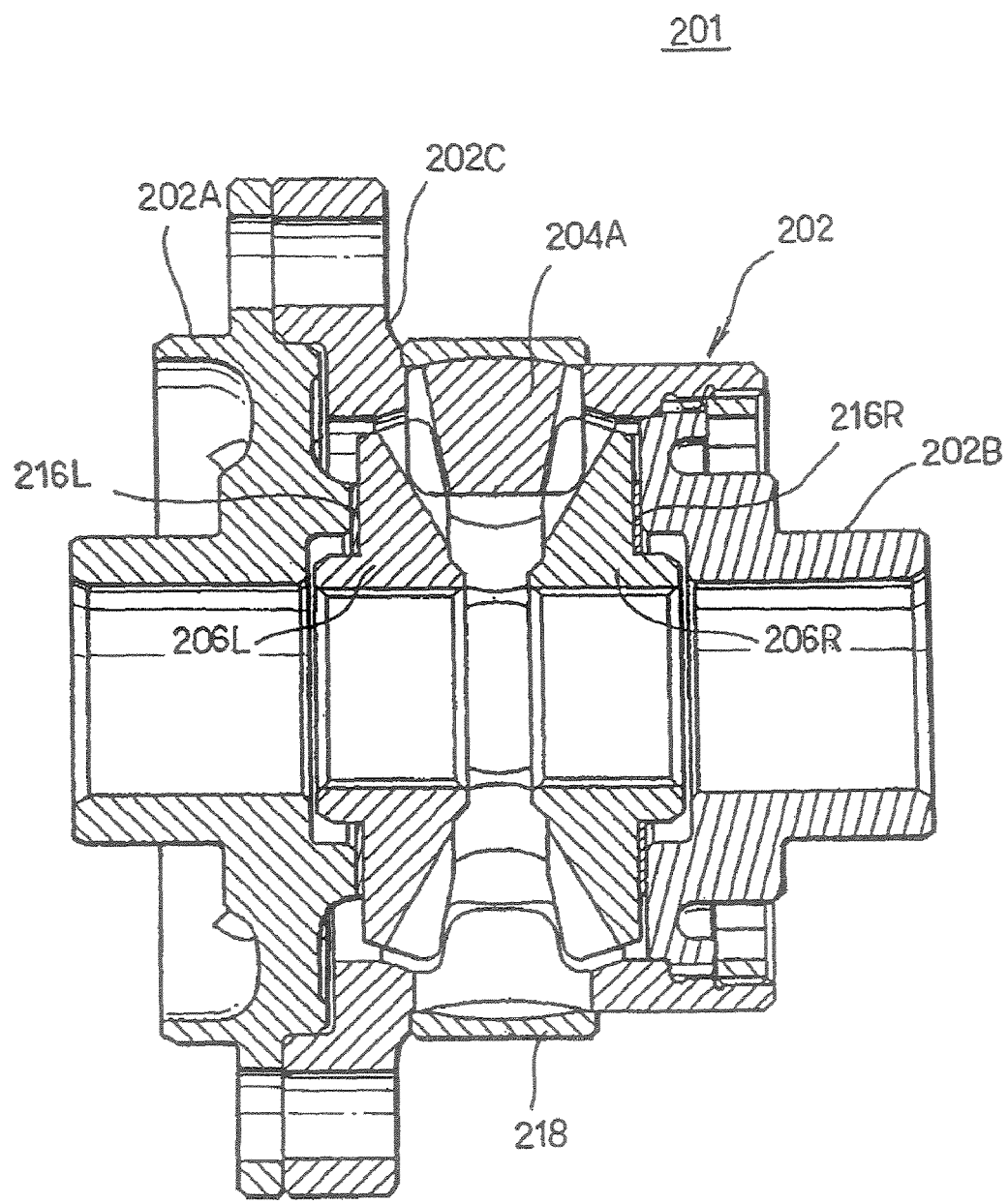

[FIG. 12]
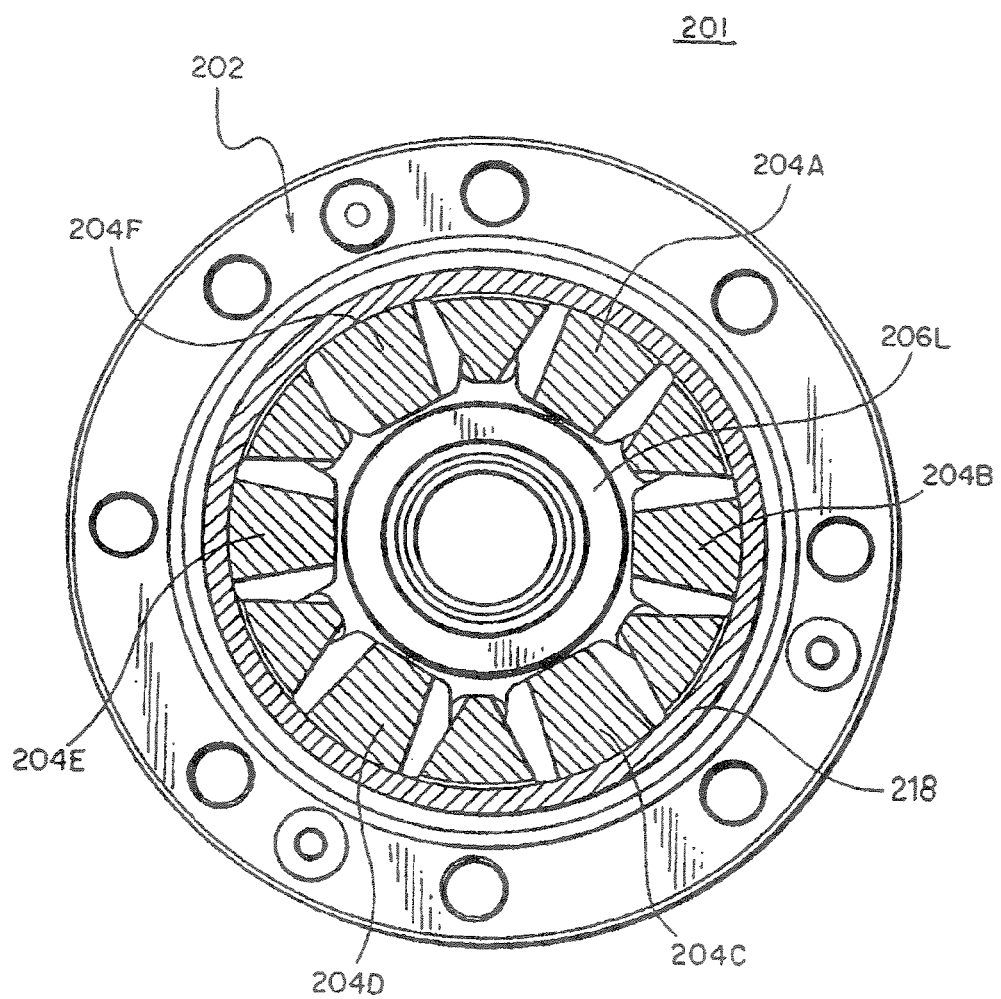

[FIG. 13]
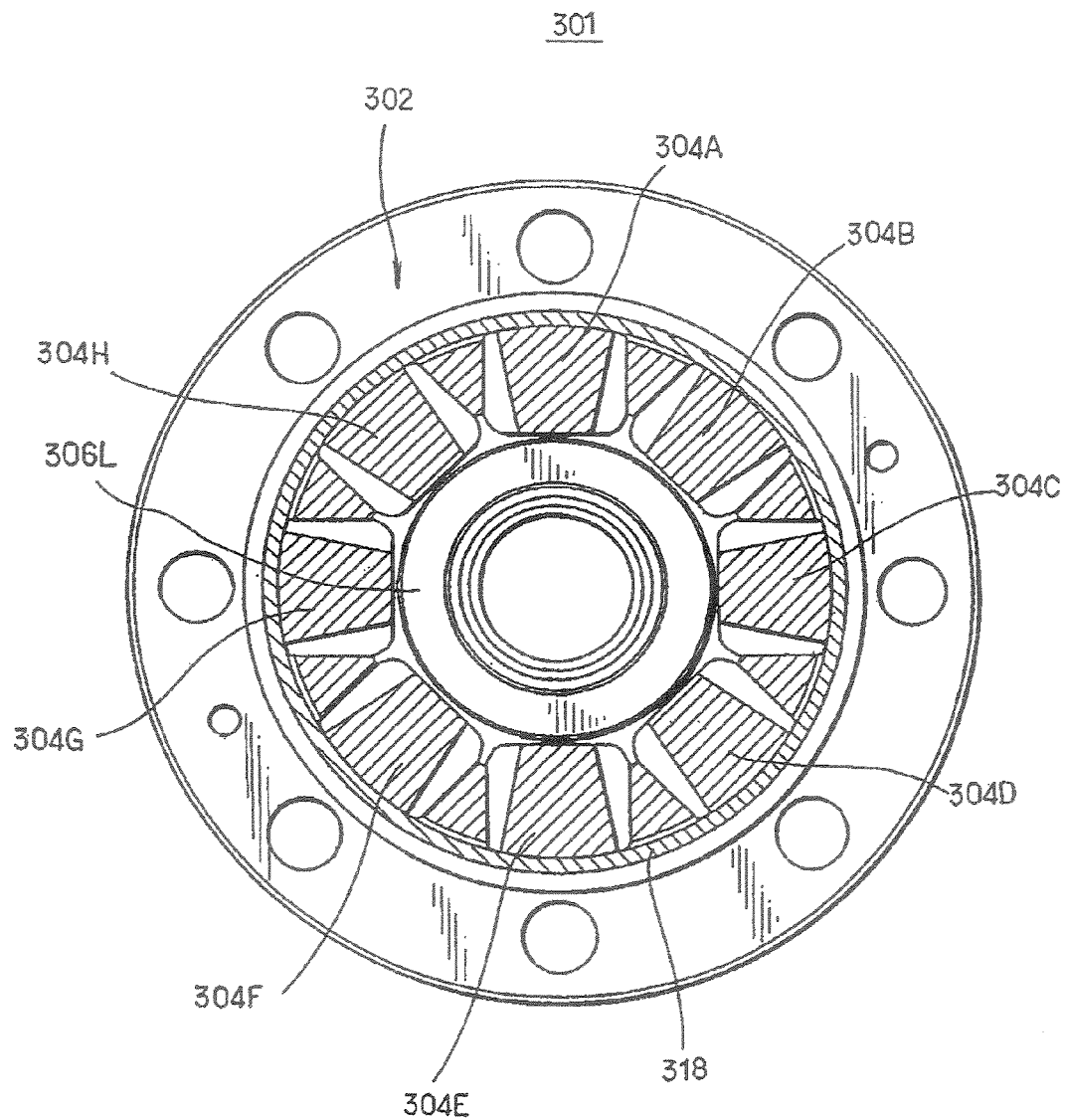

[FIG. 15]
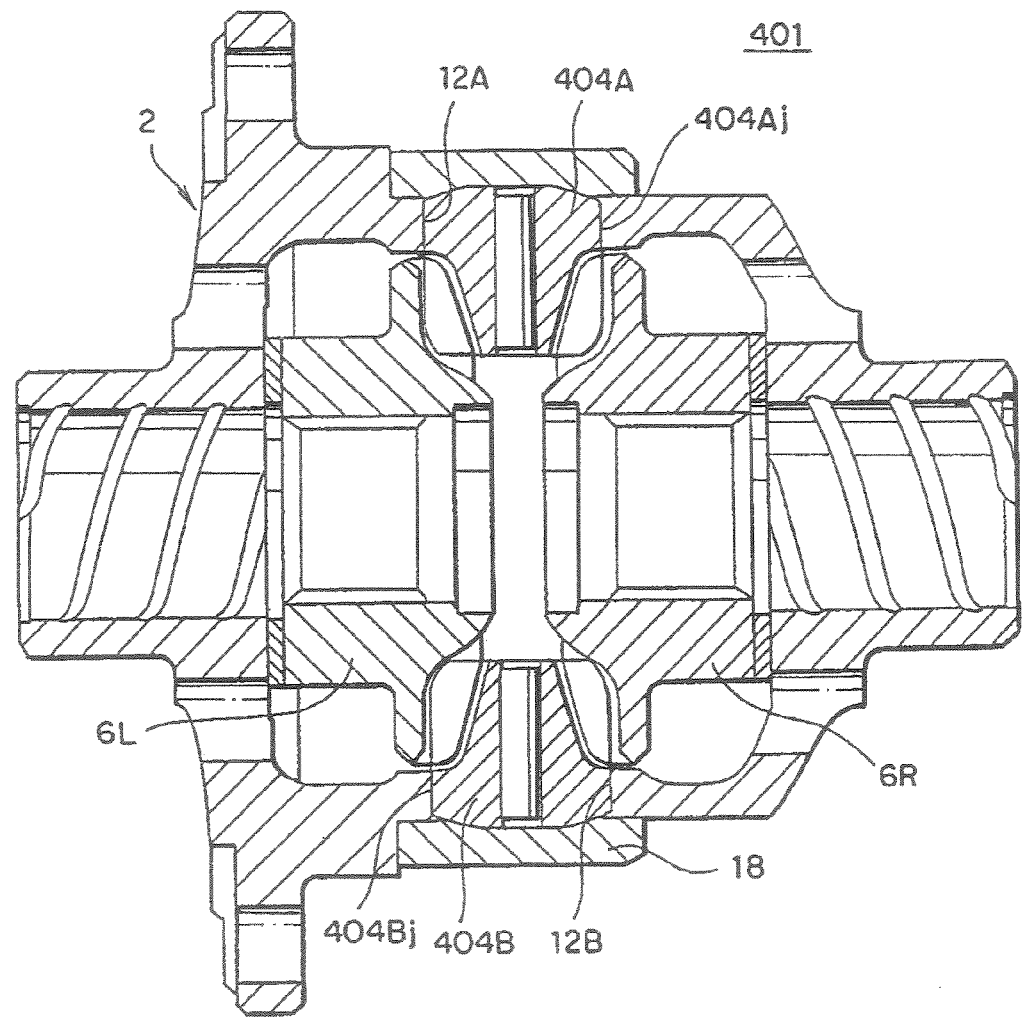

[FIG. 17]
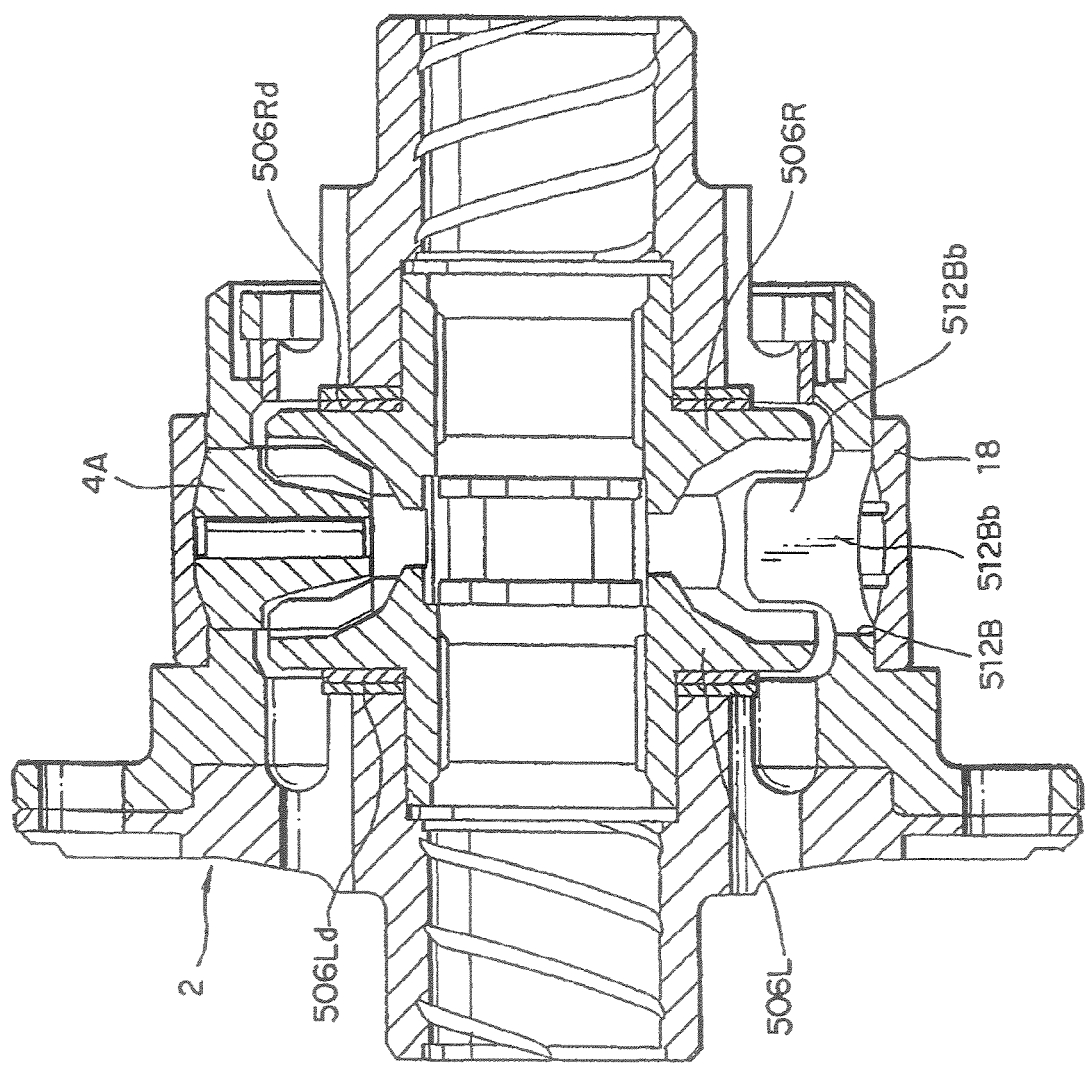

[FIG. 18]
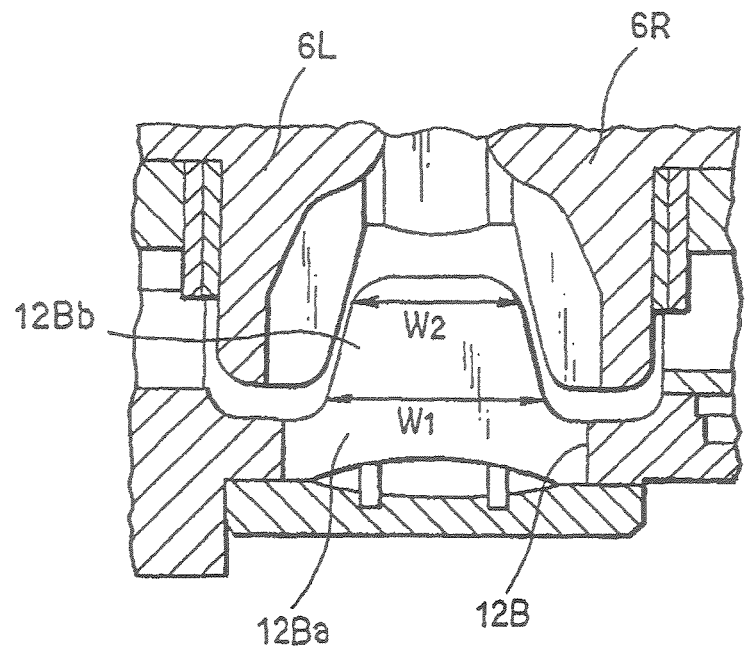
[FIG. 19]
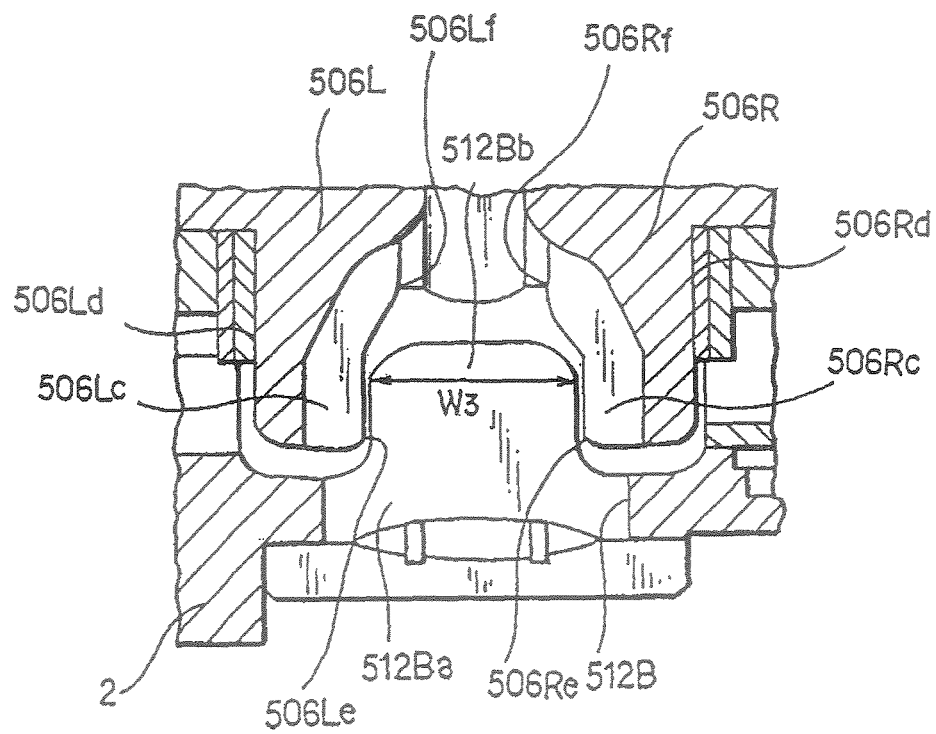

[FIG. 20]
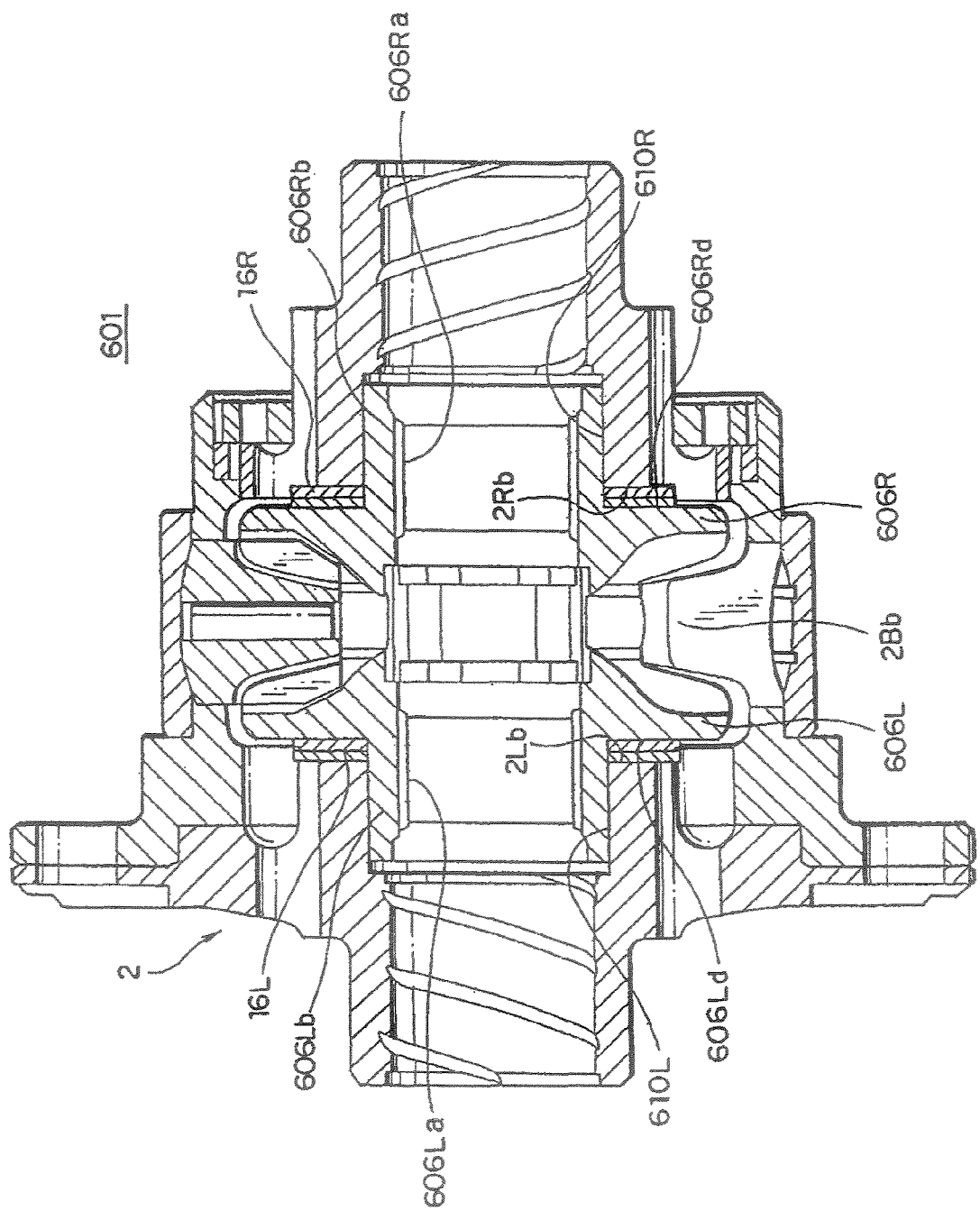

[FIG. 21]
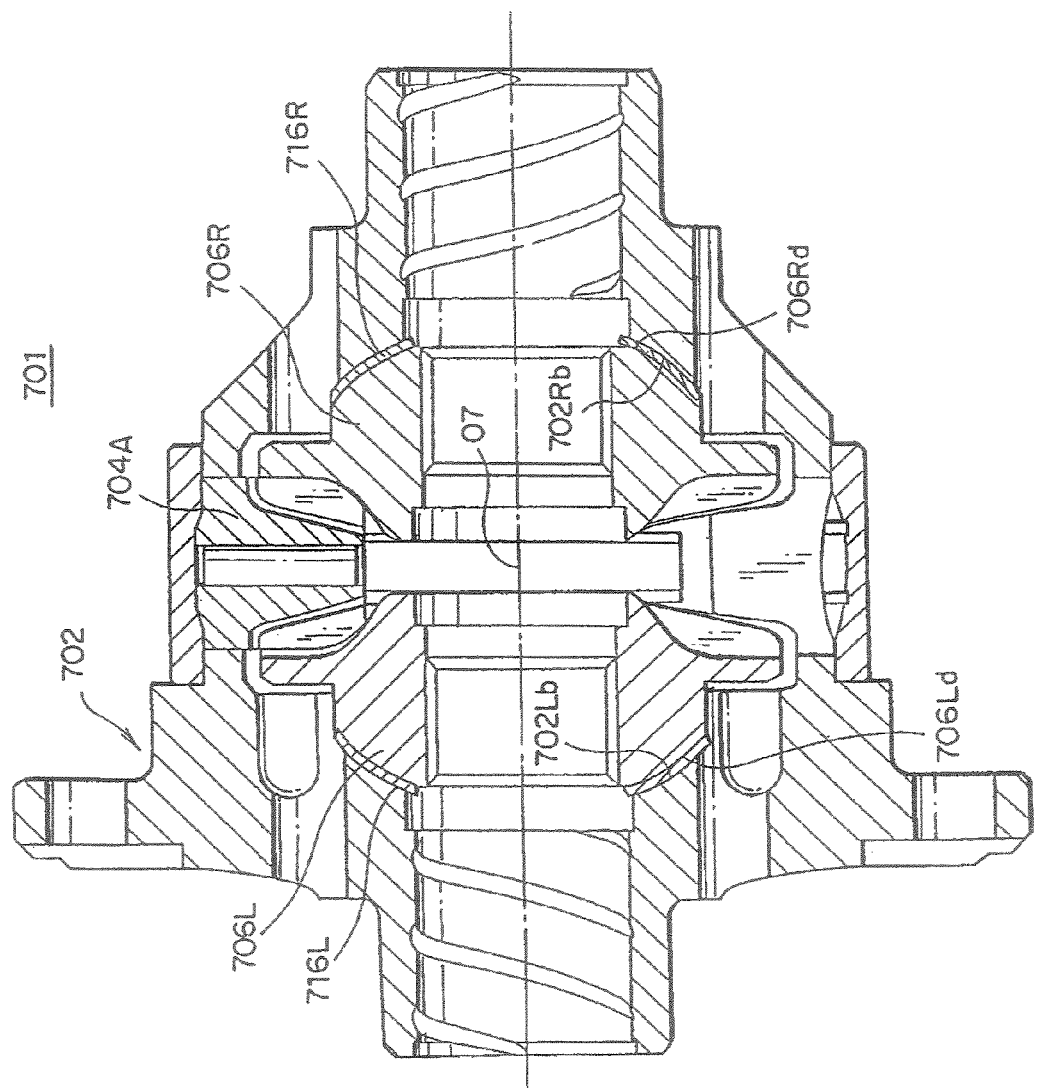

[FIG. 22]
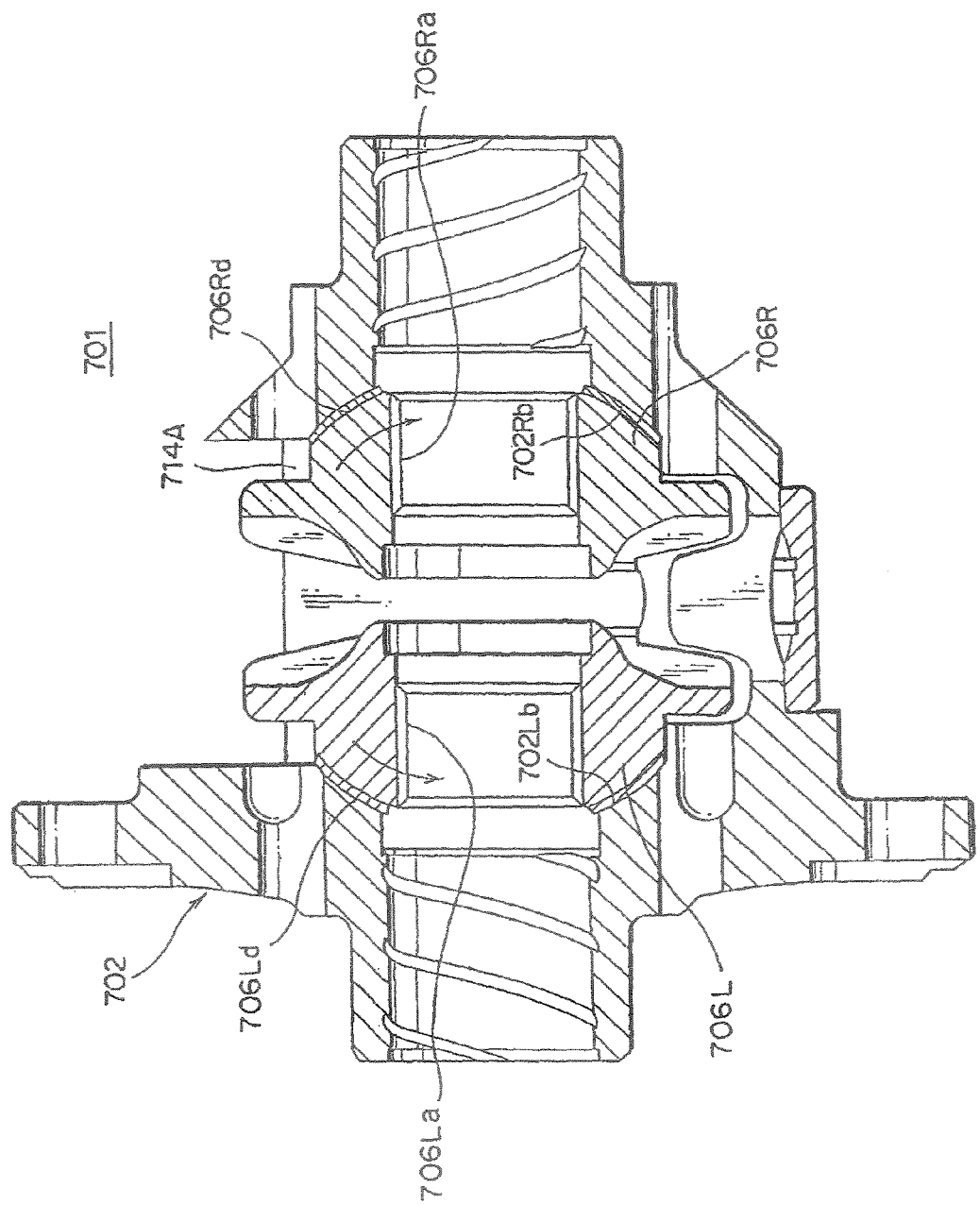

[FIG. 23]
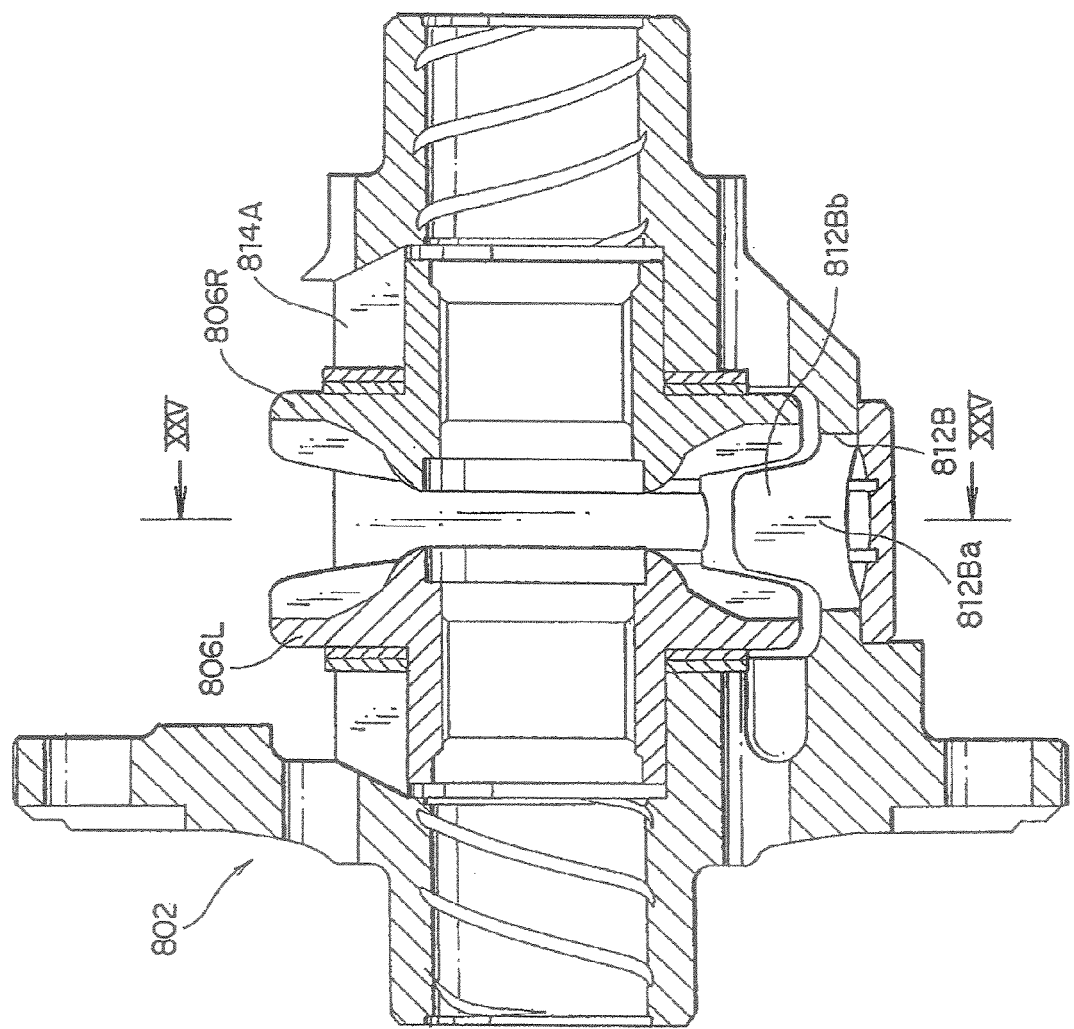

[FIG. 24]
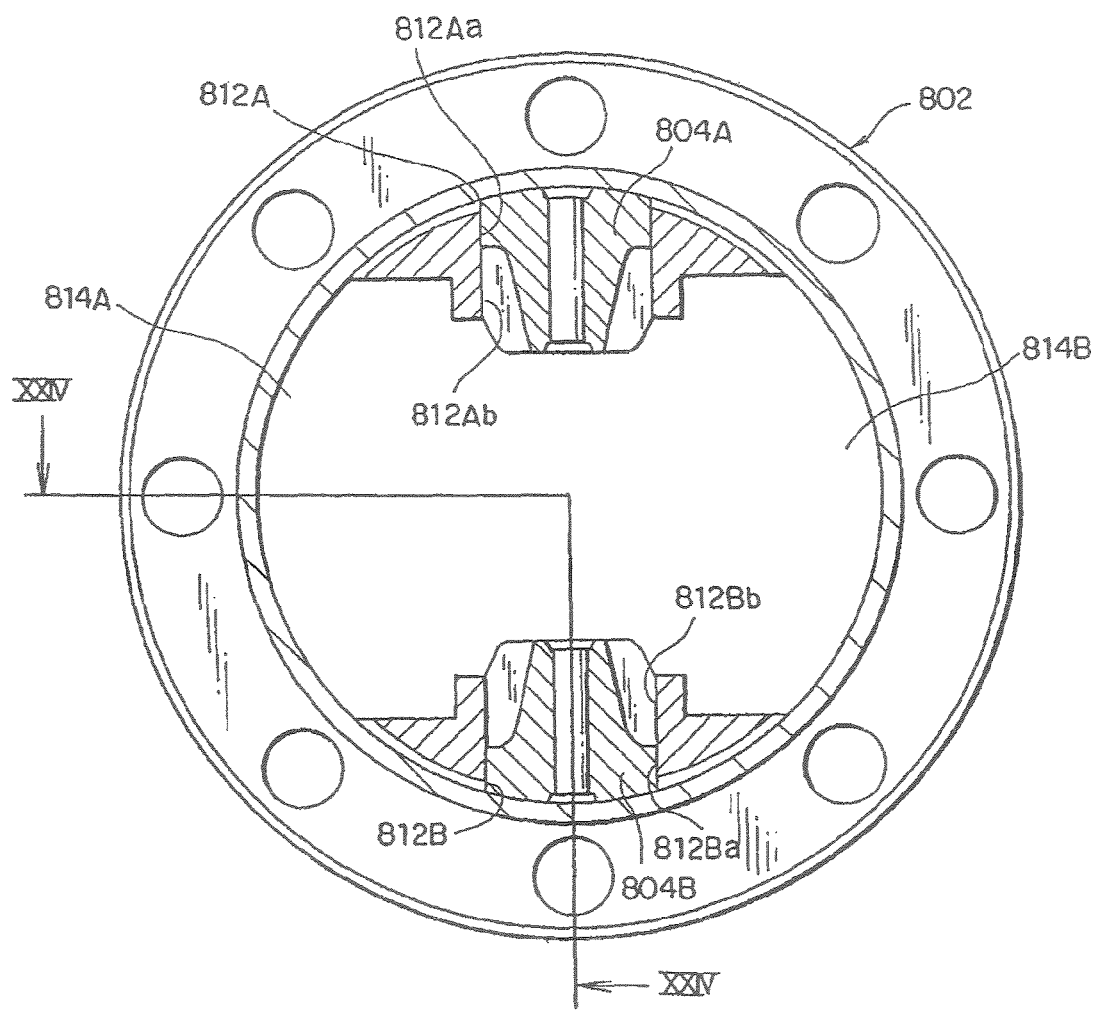

[FIG. 25]
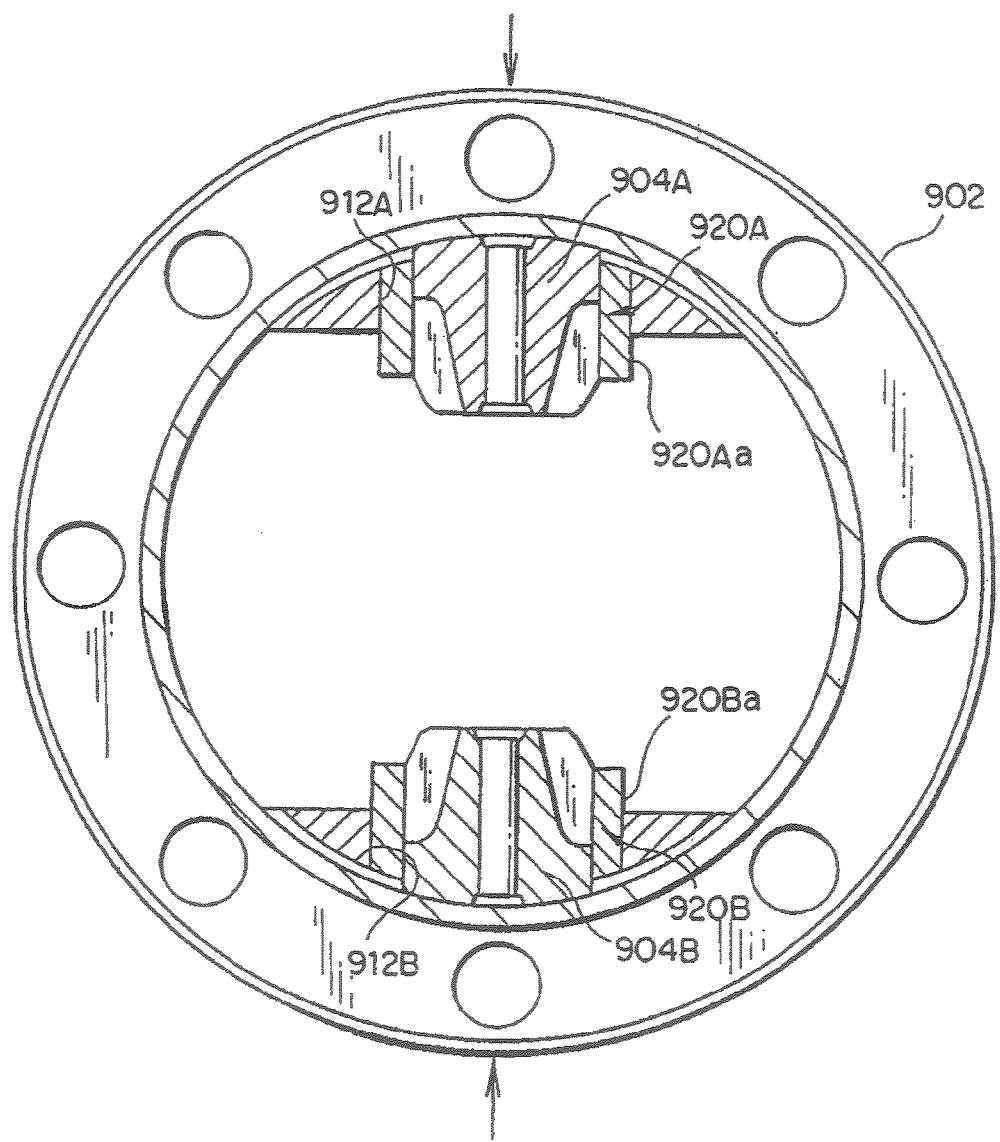

[FIG. 26]
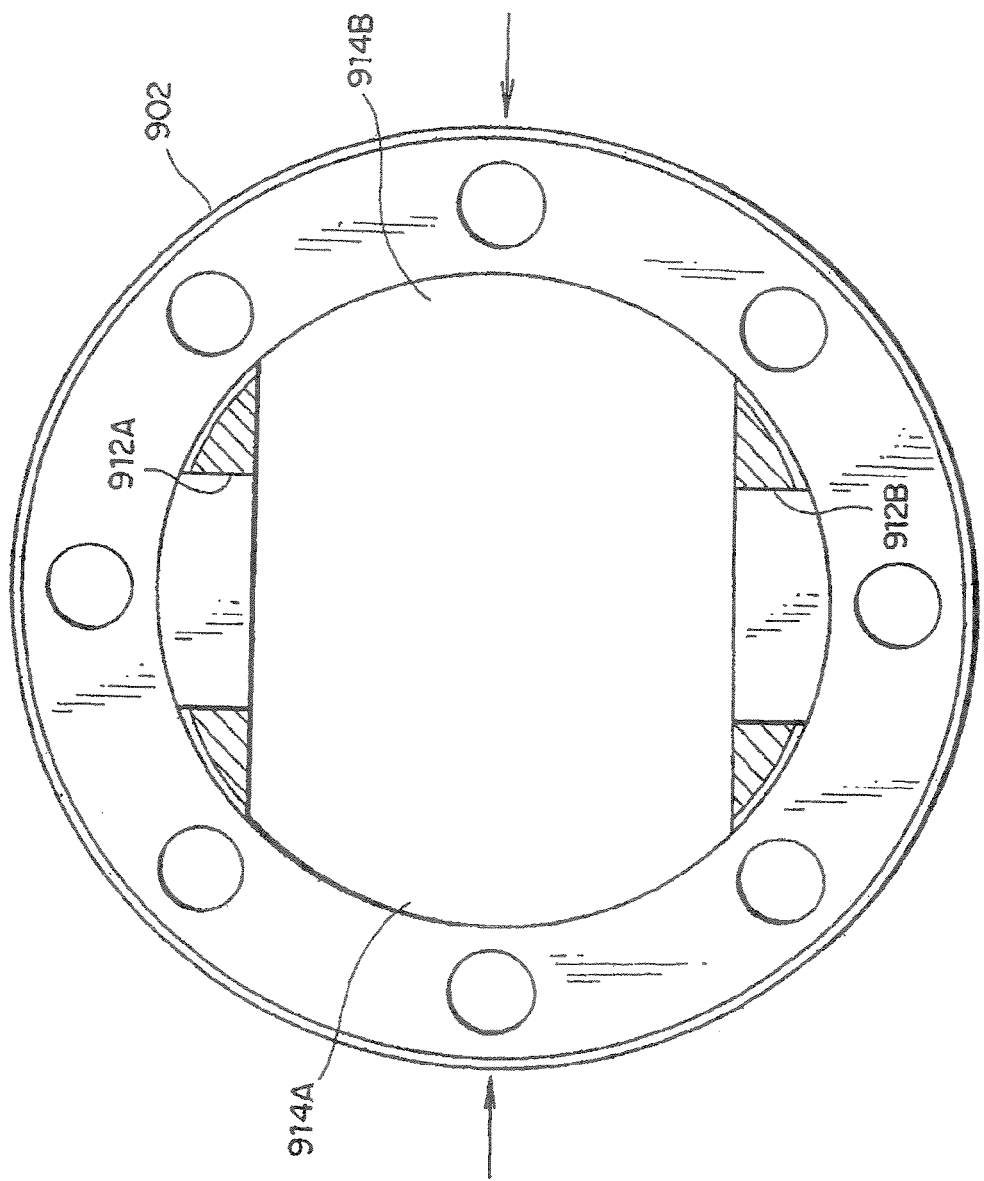

[FIG. 27]
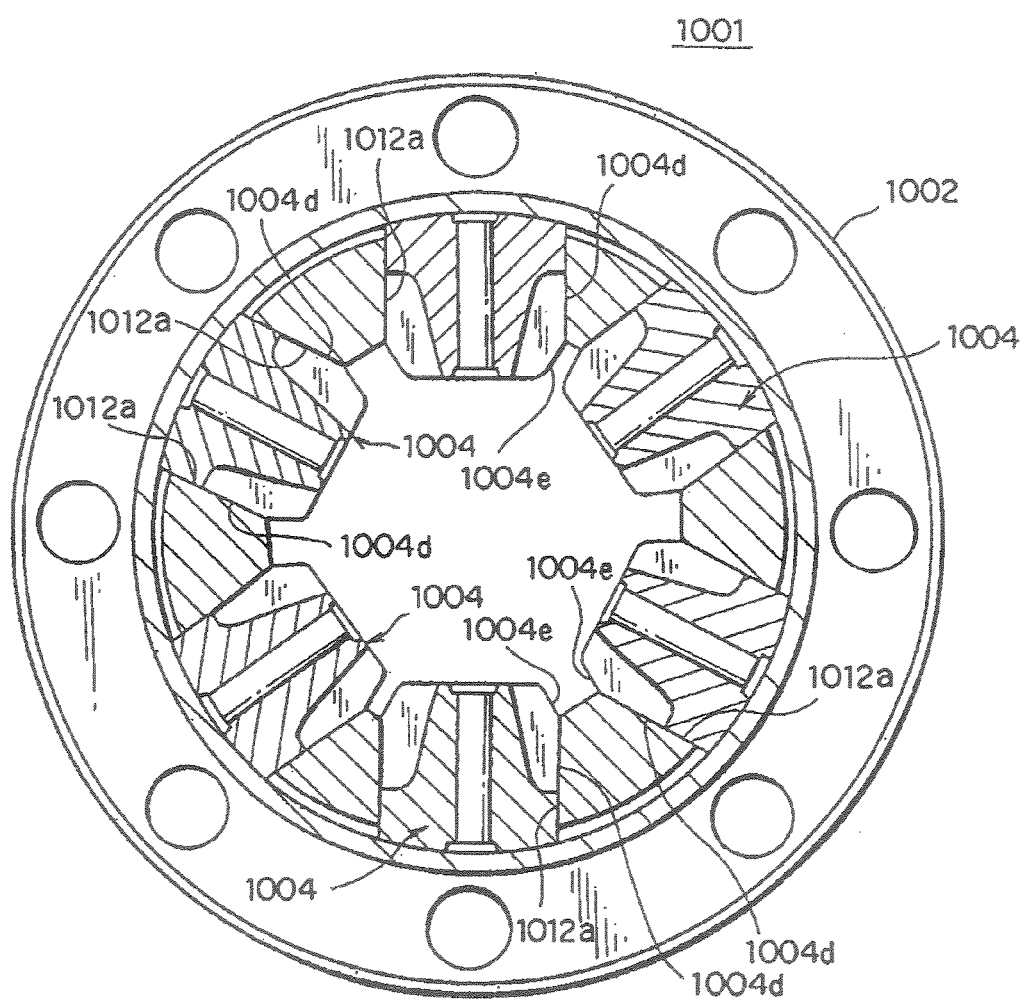

[FIG. 28]
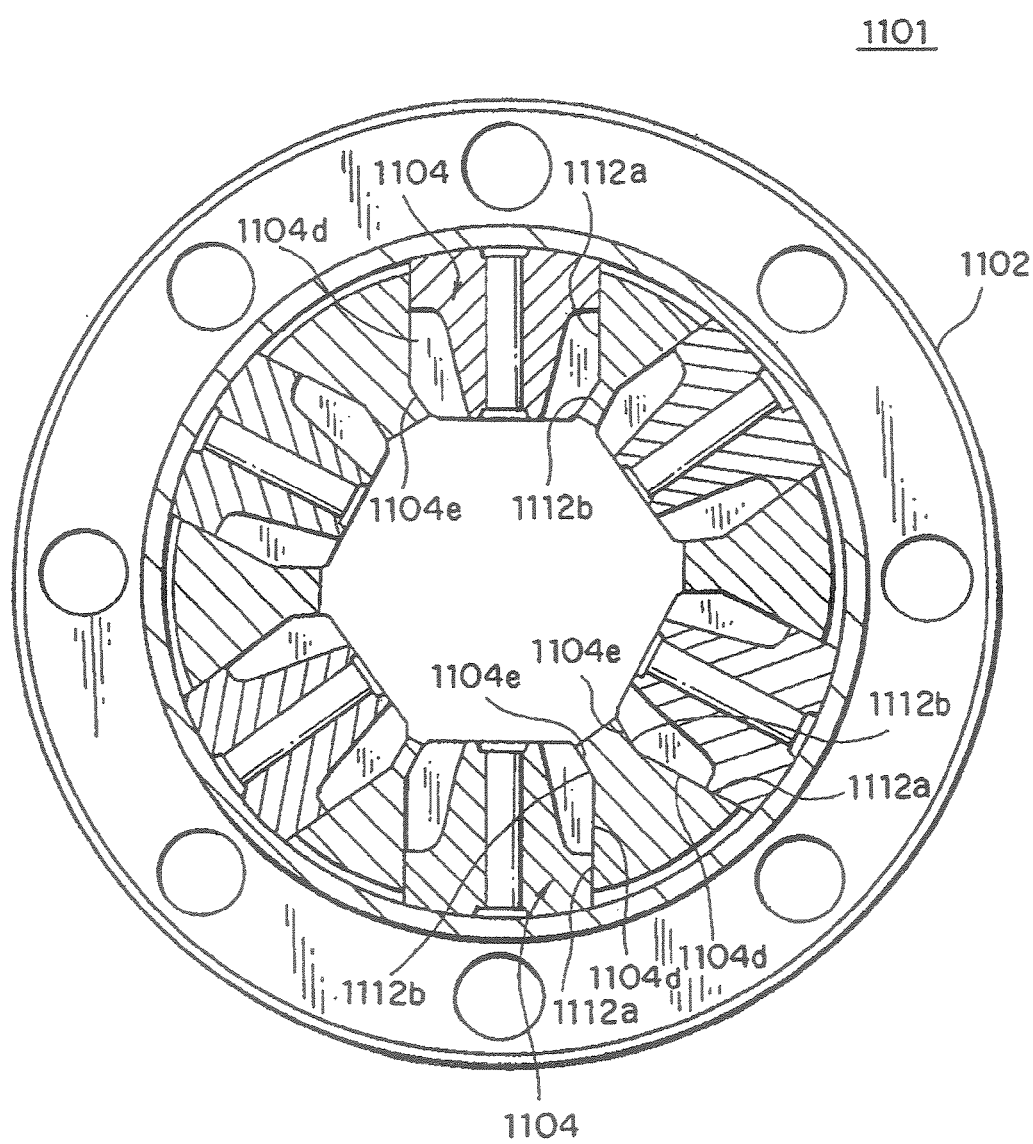

[FIG. 29]
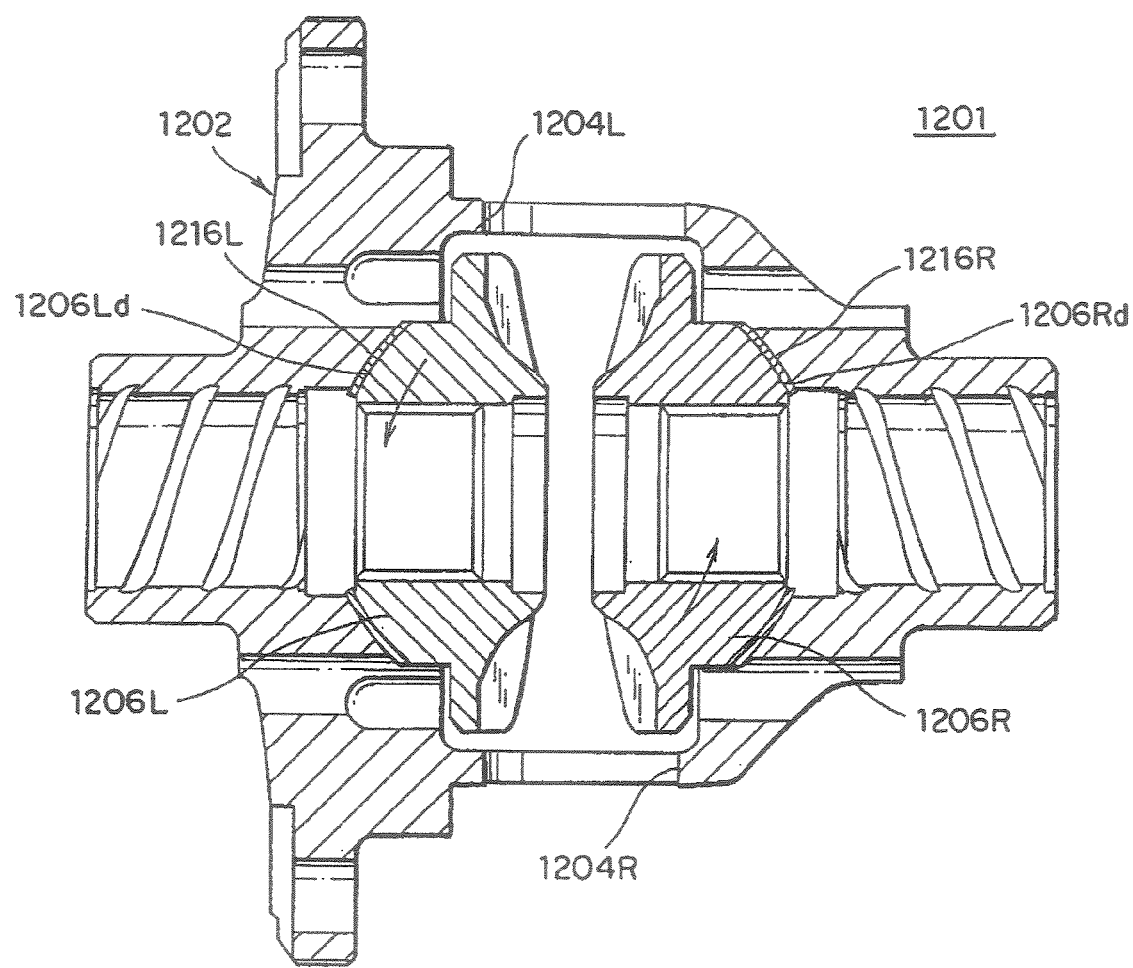

[FIG. 30]
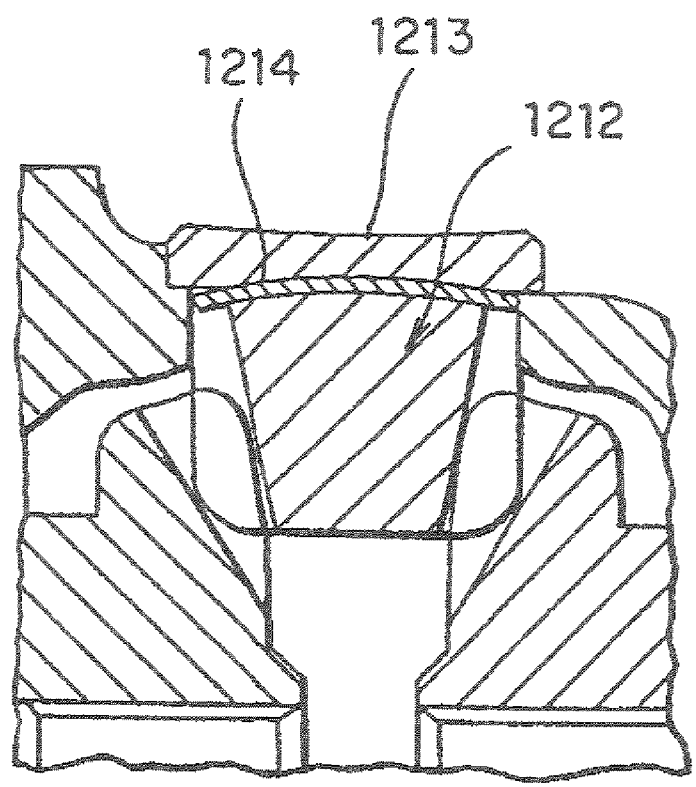

[FIG. 31]
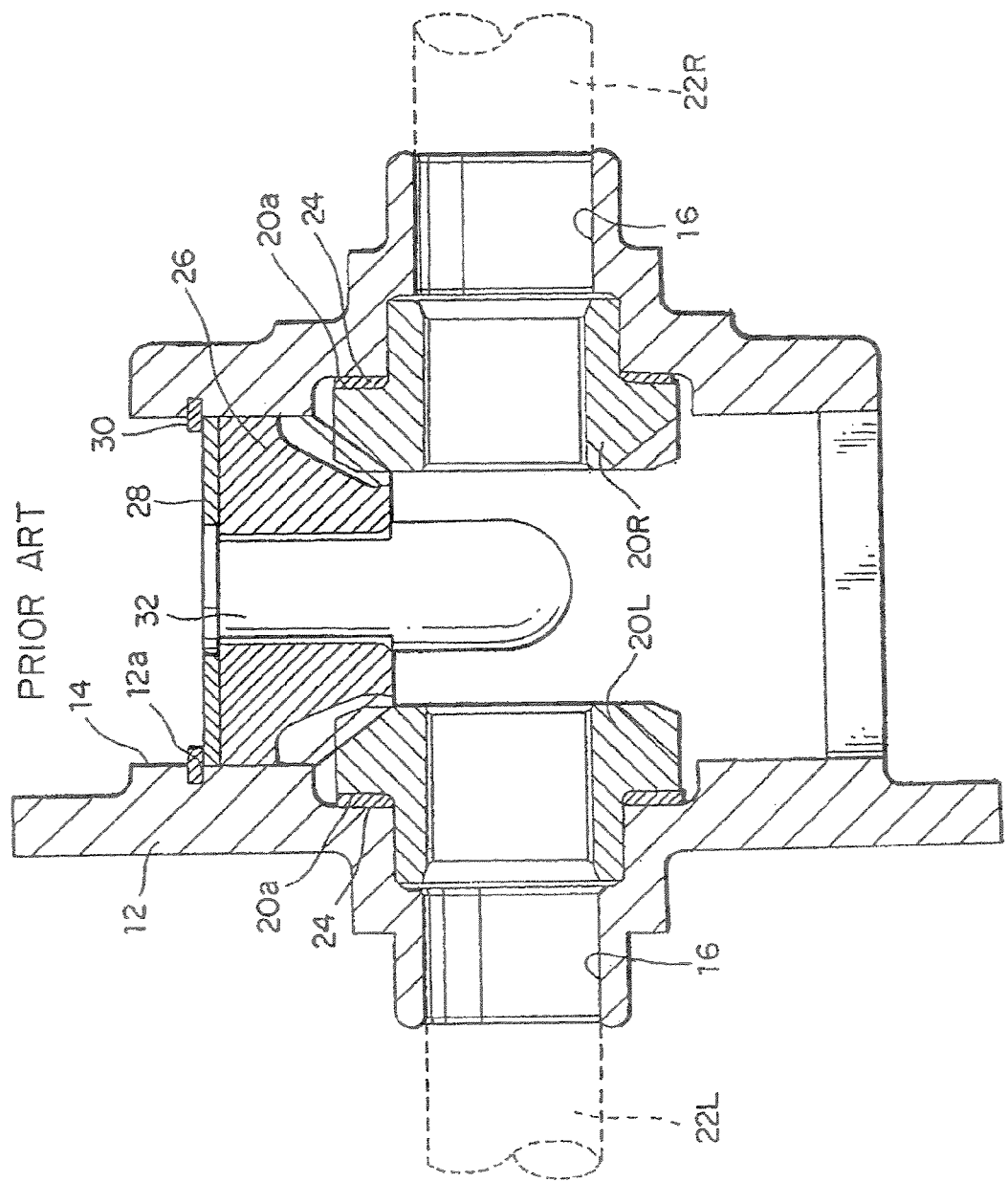

DIFFERENTIAL GEAR APPARATUS FOR VEHICLE

TECHNICAL FIELD

The present invention relates to a differential gearing for vehicle, and in particular, to a differential gearing for vehicle comprising a plurality of pinion gears which are rotatably held within a differential case and a pair of side gears disposed in meshing engagement with the pinion gears and connected to left and right axles respectively.

BACKGROUND ART

A conventional differential gearing for vehicle is known as having a construction as disclosed in Japanese Registered Utility Model No. 2520728, for example. This differential gearing for vehicle of the prior art will be briefly described with reference to FIG. 31. It is to be noted that reference characters for the conventional construction shown in FIG. 31 will be indicated in parentheses in this specification. Formed in a differential case (12) are a pinion gear receiving opening (14) and an axle receiving opening (16) which extend orthogonally to each other. Left and right side gears (20L, 20R) are disposed within the differential case (12) so as to be axially movable therein and are splined to left and right axles (22L, 22R), respectively which are inserted into the axle receiving opening (16). Sliding members (24) of a smaller diameter than the side gears (20L, 20R) are disposed between the back surface (20a, 20a) of the left and right side gears (20L, 20R) and the internal surface of the differential case (12).

Also disposed within the differential case (12) is a pinion gear (26) having substantially the same diameter as the pinion gear receiving opening (14) and rotatable supported therein in meshing engagement with the left and right side gears (20L, 20R). A pinion gear holding plate (28) is fitted over the external diameter of the pinion gear (26), which is prevented from being removed from the case (12) by a snap ring (30) which is fitted into a groove (12a) in the differential case (12). A pinion shaft (32) is passed through the pinion gear (2) in alignment with the axis thereof to prevent its tilting.

To assemble the differential gearing for vehicle constructed in the manner mentioned above, the sliding members (24) and the left and right side gears (20L, 20R) are assembled from the outside of the differential case (12) into the differential case (12) through the pinion gear receiving opening (14). The pinion gear (26) is then assembled into the pinion gear receiving opening (14) from the outside of the differential case (2) in which the side gears (20L, 20R) have been assembled so as to mesh with the latter. At this time, the pinion shaft (32) is previously disposed within the differential case (12) so that the pinion gear (26) can be passed over the pinion shaft (32). After the pinion gear (26) has been assembled into the pinion gear receiving opening (14), the pinion gear holding plate (28) is fitted, which is then prevented from being removed by the snap ring (30).

The conventional construction mentioned above is subject to various problems as mentioned below.

1. Because the pinion gear is carried by the differential case only over an area located outward of the meshing engagement with the side gears, there remains a problem that when a torque is applied to the differential case, the pinion gear may be tilted in the circumferential direction, causing a likelihood of a biased abutment to induce an abrasion.
2. Because the side gears are inserted into the differential case through the pinion gear receiving opening, it is impossible to choose a diameter of the side gears which is greater than the diameter of the pinion gear. It is also necessary to insert one of the side gears initially before the other side gear is inserted, and this prevents a spacing between the side gears from being reduced. Consequently, the gearing requires an increased size and involves an increased rotational backlash.
3. Because the pinion holding plate (locking washer) which prevents a removal of the pinion gear is planar, there results a problem that when a force is applied to the pinion gear to cause to be displaced, there occurs a change in the center-to-center distance with respect to the side gear to produce a displacement in a meshing position.
4. Because the side gears are relatively small while the pinion gear is relatively large as mentioned above, the peripheral speed during the rotation increases as a result of an increased diameter (external diameter) of the pinion gear to enhance a thermal expansion thereof, producing a likelihood of causing a seizure. To avoid this problem, it is necessary to increase a clearance, resulting in an increased amount of the backlash as mentioned previously.
5. When the pinion gear increases in size, it is susceptible to the influence of a centrifugal force, producing a variation in the differential action limiting force, and this produces a problem that a change in the performance is likely to occur.

This invention is proposed to cope with these problems, it is an object of the present invention to provide a differential gearing for vehicle which is capable of suppressing a tilting of a pinion gear if a differential case rotates to apply a force upon the pinion gear, thereby maintaining an appropriate action while suppressing a biased abrasion of sliding parts.

PATENT REFERENCE 1: Japanese Registered Utility Model No. 2520728

DISCLOSURE OF THE INVENTION

Problem to be Solved by the Invention

The invention defined in Claim 1 is characterized in that a differential gearing for vehicle comprising a plurality of pinion gears which are rotatable held in pinion gear receiving openings formed in a differential case, and a pair of side gears disposed in meshing engagement with the pinion gears and connected to a pair of axles, respectively, by providing a pinion gear holding surface on the pinion gear receiving opening which is in sliding contact with the pinion gear and which extends inward into the differential case to support at least part of the pinion gear which is in meshing engagement with the side gears.

According to the above invention, the differential case has a pinion gear holding surface which extends inward into the differential case in order to support at least part of an inwardly located meshing portion of the pinion gear, thus achieving an object of suppressing a tilting of the pinion gear during its rotation. It is to be understood that "supporting at least part of a meshing portion of the pinion gear" refers to supporting at least part of teeth of the pinion gear, or specifically, at least part of a tooth crest which is located diametrically outward of a region of the teeth of the pinion gear which is in contact with the teeth of the side gear.

According to the invention defined in Claim 2, the pinion gear is held in the differential case by the pinion gear holding surface mentioned above and a locking ring which is fitted around the outer periphery thus avoiding the need for a pinion shaft which would normally extend through the axis of the pinion gear to allow the pinion gear to be reduced in size while also allowing a spacing between the pair of side gears to be reduced to reduce a size as measured in the direction of the axle and also allowing the weight thereof to be reduced.

According to the invention defined in Claim 3, the side gear is inserted, not through the pinion gear receiving opening, but through a side gear insertion opening which is separately formed, allowing the size of the side gears to be increased relative to the pinion gear. In particular, it is possible to increase the number of the teeth by a factor of 2.5 or greater, permitting the backlash to be reduced. On the contrary, the size of the pinion gear can be reduced, allowing a clearance with respect to the pinion gear holding surface on the differential case to be reduced, permitting a further reduction in the backlash.

According to the invention defined in Claim 4, a side gear insertion opening is formed at a location other than the location in the differential case where the pinion gear receiving opening is formed. Accordingly, the size of the side gears is not dependent on the size of the pinion gear, allowing them to be formed to a greater size.

According to the invention defined in Claim 5, a portion other than the meshing portion of the pinion gear which is disposed in sliding contact with the pinion gear holding surface is formed with an outer peripheral surface in the form of a solid cylinder which is continuous throughout the entire periphery. This allows a favorable abutment of the meshing portion while suppressing a variation in the position where the pinion gear is held depending on the phase thereof, contributing to improving the strength of the gear and reducing noises generated. In addition, as a result of increased area of the portion of the pinion gear where it is held, the surface pressure can be reduced, thus improving the durability and the seizure resistance of the portion of the pinion gear where it is held.

According to the invention defined in Claim 6, a straight region having the same diameter as the outer peripheral surface in the form of a solid cylinder is provided, allowing the pinion gear holding surface to hold not only the outer peripheral surface in the form of the solid cylinder, but also part of the straight region, whereby the area of the portion of the pinion gear where it is held can be increased to reduced the surface pressure, improving the durability and the seizure resistance of such portion to be improved.

According to the invention defined in Claim 7, the tooth crest cone angle on the outer periphery of the side gear is chosen to be greater than the tooth crest cone angle on the inner periphery, and the portion of the pinion gear holding surface which extends inward into the differential case is formed in conformity to the tooth crest on the outer periphery of the side gear, thereby allowing the width of the pinion gear holding surface on its inner side to be increased and allowing the area of the entire holding surface to be increased to reduce the surface pressure applied to the pinion gear holding surface, thus improving the durability and the seizure resistance of the holding surface.

According to the invention defined in Claim 8, a sliding surface on the back surface of the side gear and the surface of the differential case which support this side gear are formed to be spherical surfaces having substantially matching curvatures, whereby when the side gear is assembled into one-piece differential case, the side gear can be inserted by inserting one end of the side gear into the differential case while rotating the spherical surface on the side gear along the spherical surface on the differential case, thus allowing the side gear insertion opening to be reduced in size and also improving the strength of the differential case.

According to the invention defined in Claim 9, a thrust washer is interposed between the spherical sliding surface on the side gear and the support surface on the differential case which supports this side gear to adjust a meshing engagement with the pinion gear, thereby allowing a machining error of the side gear to be corrected while securing a good meshing engagement with the pinion gear.

According to the invention defined in Claim 10, a thrust washer is interposed between the pinion gear and a locking ring for the pinion gear to adjust a meshing engagement between the pinion gear and the side gear, and accordingly, the meshing engagement between the gears can be adjusted by changing the thickness of the thrust washer to secure a good meshing engagement between the pinion gear and the side gears.

According to the invention defined in Claim 11, a pair of side gears which are connected to a pair of axles and a plurality of pinion gears which mesh with these side gears at right angles are contained within a differential case, and a pinion gear holding member is provided which supports at least part of a meshing portion of the pinion gear which is in meshing engagement with the side gears. The pinion gear holding member is designed so that it can be assembled after the side gears have been inserted into the differential case. Accordingly at the time when the side gears are inserted, the pinion gear holding member is not mounted, thus removing any obstruction to the insertion of the side gears, allowing them to be easily inserted.

According to the invention defined in Claim 12, the pinion gear holding member is inserted into the differential case through an opening formed in a region of the differential case where the pinion gear is to be assembled, and thus can be directly secured to the differential case to define a holding surface for the pinion gear.

According to the invention defined in Claim 13, the pinion gear which is rotatable held within the pinion gear receiving opening formed in the differential case has an outer surface which comprises a straight portion which is formed toward the inlet of the pinion gear receiving opening and a tapered portion toward the inner end which is internally inserted while a pinion gear holding surface on the pinion gear receiving opening extends inward into the differential case so as to hold the straight portion and the tapered portion. When the pinion gear is held in this manner up to its inner end, it is possible to disperse the surface pressure to the pinion gear thus improving the durability and the seizure resistance. In addition, when the pinion gear is held up to its innermost end, there is obtained an effect of preventing a tilting of the pinion gear to allow a normal meshing engagement to be maintained thus improving the strength of the gear.

Effect of the Invention

According to the differential gearing for vehicle relating to this invention, it is arranged that the pinion gear holding surface on the pinion gear receiving opening supports at least part of the meshing engagement of the pinion gear, if a differential case rotates to apply a force upon a pinion gear, it is possible to suppress a tilting of the pinion gear, thereby maintaining an appropriate action while suppressing a biased abrasion of sliding parts.

BRIEF DESCRIPTION OF THE DRAWINGS

FIG. 1 is a front view of a differential gearing for vehicle according to a first embodiment. (Embodiment 1)

FIG. 2 is a cross section taken along the line II-II shown in FIG. 1.

FIG. 3 is a side elevation of the differential gearing for vehicle.

FIG. 4 is a cross section taken along the line IV-IV shown in FIG. 3.

FIG. 5 is a rear view of the differential gearing for vehicle.

FIG. 6 is an exploded perspective view of the differential gearing for vehicle.

FIG. 7 is a front view of a differential case

FIG. 8 is a cross section taken along the line VIII-VIII shown in FIG. 7.

FIG. 9 is a longitudinal section of a differential gearing for vehicle according to a second embodiment. (Embodiment 2)

FIG. 10 is a cross section of the differential gearing for vehicle.

FIG. 11 is a longitudinal section of a differential gearing for vehicle according to a third embodiment. (Embodiment 3)

FIG. 12 is a cross section of the differential gearing for vehicle.

FIG. 13 is a longitudinal section of a differential gearing for vehicle according to a fourth embodiment. (Embodiment 4)

FIG. 15 is a longitudinal section of a differential gearing for vehicle according to a fifth embodiment. (Embodiment 5)

FIG. 17 is a longitudinal section of a differential gearing for vehicle according to a sixth embodiment. (Embodiment 6)

FIG. 18 is an enlarged view of a pinion gear holding surface of the differential gearing for vehicle.

FIG. 19 is an enlarged view of a pinion gear holding surface of the sixth embodiment.

FIG. 20 is a longitudinal section of a differential gearing for vehicle.

FIG. 21 is a longitudinal section of a differential gearing for vehicle according to a seventh embodiment. (Embodiment 7)

FIG. 22 is a longitudinal section illustrating a side gear assembling step for the embodiment 7.

FIG. 23 is a longitudinal section of a differential gearing for vehicle, the section being taken along the line XXIV-XXIV shown in FIG. 24.

FIG. 24 is a cross section taken along the line XXV-XXV shown in FIG. 23.

FIG. 25 is a cross section of a differential gearing for vehicle according to an eighth embodiment, the section corresponding to FIG. 24 (Embodiment 8)

FIG. 26 is a cross section illustrating a condition which prevails before a pinion gear and a pinion gear support member shown in FIG. 25 are mounted.

FIG. 27 is a cross section of a differential gearing for vehicle.

FIG. 28 is a cross section of a differential gearing for vehicle according to a ninth embodiment. (Embodiment 9)

FIG. 29 is a longitudinal section of a differential gearing for vehicle according to a tenth embodiment. (Embodiment 10)

FIG. 30 is a view illustrating a holder for a pinion gear in the tenth embodiment.

FIG. 31 is a longitudinal section of an example of a differential gearing for vehicle of the prior art.

EXPLANATIONS OF NUMERALS

Figure 14A:
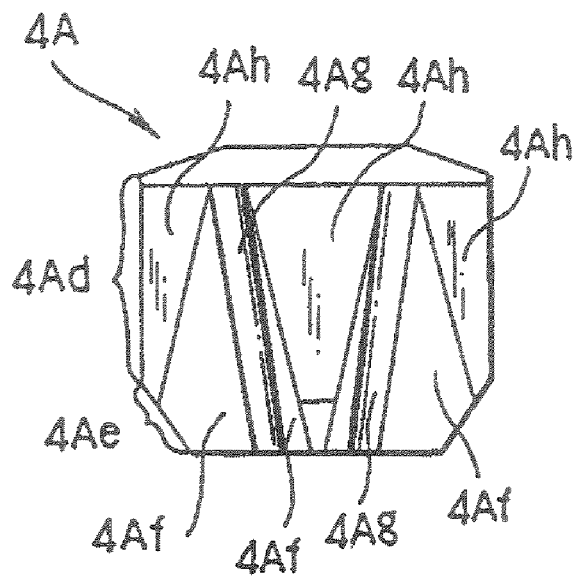
FIGS. 14A and 14B are front views showing examples of pinion gears in conventional differential gearing for vehicle.

2 Differential Case
4A Pinion Gear
4B Pinion Gear
4A*a* Meshing Portions of Pinion Gear
4B*a* Meshing Portions of Pinion Gear
4A*b* Portions of Pinion Gear
4B*b* Portions of Pinion Gear
6L Side Gear
6R Side Gear
12A Pinion Gear Receiving Opening
12B Pinion Gear Receiving Opening
12A*a* Pinion Gear Holding Surface
12B*a* Pinion Gear Holding Surface

BEST MODES FOR CARRYING OUT THE INVENTION

An object which is to suppress a tilting of a pinion gear in an operation of rotation is accomplished by means of extending a pinion gear holding surface of a differential case inward into the differential case, thus supporting at least part of a meshing portion of the pinion gear.

Embodiment 1

Referring to the drawings, several embodiments of the present invention will now be described. An initial embodiment represents a differential gearing for vehicle of two pinion type. FIG. 1 is a front view, partly omitted as viewed in the direction of an arrow I shown in FIG. 2, FIG. 2 a cross section taken along the line II-II shown in FIG. 1, FIG. 3 a side elevation, FIG. 4 a cross section taken along the line IV-IV shown in FIG. 3, FIG. 5 a rear view, as viewed in a direction indicated by an arrow V shown in FIG. 2, and FIG. 6 an exploded perspective view, FIG. 7 shows a front view of a differential case and FIG. 8 is a cross section taken along the line VIII-VIII shown in FIG. 7.

The differential gearing, generally indicated by numeral 1, comprises a pair of pinion gears 4A and 4B which are rotatably held within a differential case 2, and a pair of left and right side gears 6L and 6R received within the differential case 2 and simultaneously in meshing engagement with the both pinion gears 4A and 4B and having splines 6L*a* and 6R*a* formed on the inner surface which are connected to left and right axles, not shown.

The differential case 2 is of a one-piece type, and is internally formed with a space 8 (see FIG. 8) in which the pair of side gears 6L and 6R are received. The differential case 2 is formed with axle receiving openings 10L and 10R extending in alignment with the axis thereof and into which left and right axles are inserted, and pinion gear receiving openings 12A and 12B which extend in a direction orthogonal to the axle receiving openings 10L and 10R and facing the internal space 8. The differential case 2 is formed with a flange 2*a* disposed in a plane which is orthogonal to the axis of rotation O1 of the differential gearing 1, and a torque from a drive pinion is input thereto through a ring gear, not shown, which is mounted on the flange 2*a*.

The pinion gears 4A and 4B include meshing portions 4A*a* and 4B*a* which are inserted into the space 8 through the inlets of the pinion gear receiving openings 12A and 12B. Portions 4A*b* and 4B*b* of the pinion gears 4A and 4B which are located outwardly are rotatably carried by the inner peripheral surfaces (pinion gear holding surfaces) of the pinion gear receiving openings 12A and 12B and the entire peripheral surfaces face the pinion gear holding surfaces (In the description to follow, the pinion gear receiving openings are represented by characters 12A and 12B and the inner peripheral surfaces of the pinion gear receiving openings 12A and 12B are represented by characters 12A*a* and 12B*a*.) As indicated in FIG. 8, the inner surfaces of the pinion gear receiving openings 12A and 12B extend inwardly into the differential case 2 (such extensions being indicated by characters 12A$b$ and 12B$b$), and these pinion gear holding surfaces (the inner peripheral surfaces 12A$a$ and 12B$a$ of the pinion gear receiving openings 12A and 12B plus the extensions 12A$b$ and 12B$b$) support the portions 4A$b$ and 4B$b$ of the pinion gears 4A and 4B which are adapted to be held and part of the meshing portions 4A$a$ and 4B$a$ in a partly overlapping manner over a greater axial extent of the pinion gears 4A and 4B than in the prior art arrangement.

Side gears 6L and 6R which are received within the internal space 8 of the differential case 2 for meshing with the pinion gears 4A and 4B are straight bevel gears. The side gears 6L and 6R have a greater size in comparison to the pinion gears 4A and 4B, and may have a number of teeth which is as many as 2.5 times the number of the teeth of the pinion gears 4A and 4B or greater. Accordingly, these side gears 6L and 6R cannot be inserted through the pinion gear receiving openings 12A and 12B as in a conventional arrangement and accordingly side gear insertion openings 14A and 14B are formed in the differential case 2 at locations which are disposed orthogonal to the pinion gear receiving openings 12A and 12B (left and right sides as viewed in FIGS. 4 and 5) and the side gears are inserted through these insertion openings 14A and 14B. Because the side gears 16L and 16R of the embodiment have a greater external diameter (the external diameter of the side gears 6L and 6R is greater than a distance between the opposing ends of the both extensions 12A$b$ and 12B$b$ of the pinion gear holding surfaces shown in FIG. 8) and therefore they cannot be inserted while maintaining their axes parallel to the axis of rotation O1 of the differential gearing 1 but are inserted into the differential case 2 while they are skewed. To avoid an interference during the insertion the internal surface of the differential case 2 which defines the space 8 is formed with escape recesses 8$a$. In addition recesses 8$b$ are formed to receive hubs 6L$b$ and 6R$b$ which project from the back surface of the side gears 6L and 6R at a spacing.

Thrust washers 16L and 16R are interposed between flat surfaces on the back side of the both side gears 6L and 6R and the internal surface of the differential case 2. The pinion gears 4A and 4B which are inserted into the pinion gear receiving openings 12A and 12B are prevented from being removed by locking rings 18 which are fitted into the outer peripheral surface of the differential case 2. As indicated in FIG. 2, the locking ring 18 has an internal surface which is spherical in section and the spherical surface is disposed in sliding contact with spherical, outer surfaces 4A$c$ and 4B$c$ of the pinion gears 4A and 4B.

An assembling step of the differential gearing for vehicle 1 constructed in the manner mentioned above will be described. In this embodiment, the pinion gears 4A and 4B are relatively small while the side gears 6L and 6R are relatively large. Since the pinion gear holding surfaces extend inwardly an insertion of the side gears 6A and 6B into the differential case 2 through the pinion gear receiving openings 12A and 12B as in a conventional arrangement is inhibited. Accordingly, side gear insertion openings 14A and 14B are formed in a region of the differential case 2 where the pinion gear receiving openings 12A and 12B are not disposed, and the side gears 6A and 6B are inserted through the side gear insertion openings 14A and 14B. At this time, each of the side gears 6L and 6R is inserted into the internal space 8 within the differential case 2 while skewing the axis of the side gear. In the present embodiment, the pinion gear holding surfaces formed on the differential case 2 (the inner peripheral surfaces 12A$a$ and 12B$a$ of the pinion gear receiving openings 12A and 12B) extend inwardly (extensions 12A$b$ and 12B$b$ from the internal surfaces of the pinion gear receiving openings 12A and 12B are shown in FIG. 8), thus extending inwardly of the external diameter of the side gears 6L and 6R. However, since the side gears 6L and 6R are inserted while skewing them, they can be inserted without an interference with the pinion gear holding surface extensions 12A$b$ and 12B$b$.

Subsequently, the side gears 6L and 6R which have been inserted into the differential case 2 are shifted to the left and to the right within the internal space 8. For example, referring to FIG. 2, the left side gear 6L having teeth which are directed to the right is shifted to the left as viewed in this Figure while the right side gear 6R having teeth which are directed to the left is shifted to the right as viewed in this Figure. At this time, to avoid one of the extensions 12A$b$ and 12B$b$ from the pinion gear holding surfaces which are disposed upward and downward as viewed in this Figure, the side gears 6L and 6R are shifted until they abut against the escape recesses 8$a$ which are located adjacent to the other pinion gear holding surfaces. For example, to avoid the extension 12A$b$ from the pinion gear holding surface which holds the upper pinion gear 4A shown in FIG. 2, the lower ends of the side gears 6L and 6R are brought into abutment against the escape recesses 8$a$ which are located adjacent to the lower pinion gear holding surface. At this point in time, the side gears 6L and 6R remain with skewed axes.

The side gears 6L and 6R are then turned up about fulcrums defined by points of abutment against the escape recesses 8$a$ to bring the axes of the side gears 6L and 6R into alignment with the axis of rotation O1 of the differential gearing 1. Since the escape recesses 8$a$ and recesses 8$b$ are formed within the internal space 8 of the differential case 2 in order to avoid an interference which might occur during the insertion of the side gears 6L and 6R, it is impossible to hold the side gears 6L and 6R in coaxial relationship with respect to the differential case 2 by themselves, but when the two pinion gears 4A and 4B are inserted through the pinion gear receiving openings 12A and 12B which are formed in the opposite sides of the differential case 2 and brought into meshing engagement with both the left and right side gears 6L and 6R, the side gears 6L and 6R can then be maintained in coaxial relationship.

The operation of the differential gearing for vehicle 1 constructed in the manner mentioned above will now be described. A torque from an engine is input to the differential case 2 through a drive pinion and a ring gear, both not shown, for rotation in either direction around the axis of rotation O1 Left and right axles, not shown, are splined to the left and right side gears 6L and 6R for transmitting torques.

When resistances which both left and right wheels experience are equal the input torque is transmitted to the differential case 2, and the two pinion gears 4A and 43 which are held by the differential case 2 as well as the left and right side gears 6L and 6R which are disposed in meshing engagement with these pinion gears 4A and 43 rotate in an integral manner, transmitting an equal amount of torque to each of the both axles, thus driving both left and right wheels.

When a vehicle is going to turn, for example, when it is going to turn to the left, left wheels experience a greater resistance. Alternatively, when wheels on one side experience a slip due to bad road conditions, for example, when right wheels get into a mire, right wheels experience a smaller resistance. Under these circumstances, the left axle and the left side gear 6L rotate at a slower rate than the rotation of the differential case 2. Since the pinion gears 4A and 43 are received within the pinion gear receiving openings 12A and 12B in the differential case 2 to be rotatable, and thus rotate about their own axes while being held by the pinion gear holding surfaces (the inner peripheral surfaces 12A$a$ and 12B*a* of the pinion gear receiving openings 12A and 123 and the extensions 12A*b* and 12B*b*), the right side gear 6R and the right axle rotate at a higher rate than the rotation of the differential case 2.

In this manner, the pinion gears 4A and 43 rotate in response to a force which is input from the ring gear, not shown, and are urged by the pinion gear holding surfaces generating a frictional resistance. This frictional force limits differential rotations of the left and right side gears 6L and 6R, also limiting a differential rotation of the left and right axles which are splined to the left and right side gears 6L and 6R. The rotation of the pinion gears 4A and 4B and the left and right side gears 6L and 6R generates thrust forces at the meshing surfaces between the pinion gears 4A and 4B and the side gears 6L and 6R, urging the left side gear 6L as viewed in FIG. 2 to the left and urging the right side gear 6R to the right. As the respective side gears 6L and 6R shift, the thrust washers 16L and 16R are pressed against the internal surface of the differential case 2 thereby generating frictional resistances. Such frictional forces limit differential rotations of the left and right side gears 6L and 6R, also limiting differential rotations of the left and right axles which are splined to the left and right side gears 6L and 6R. It is desirable that each of the pinion gears 4A and 4B has a number of teeth which is equal to or less than 8 or optimally 6. When the number of the teeth is maintained equal to or below 8, the strength of the teeth can be maintained if the pinion gears 4A and 4B are formed into a reduced size, thus allowing a variation in the differential action limiting force under the influence of centrifugal forces which may result from a reduced size of the pinion gears to be suppressed.

In the differential gearing for vehicle 1 according to the present embodiment, the pinion gear holding surfaces formed around the inner peripheral surfaces 12A*a* and 12B*a* of the pinion gear receiving openings 12A and 12B in the differential case 2 extend inwardly of the differential case 2 (refer extensions 12A*b* and 12B*b* shown in FIG. 8). Accordingly, portions 4A*b* and 4B*b* of the pinion gears 4A and 4B where these gears are held and part of meshing portions 4A*a* and 4B*a* can be supported in the circumferential direction of the side gears 6L and 6R while they are overlapping in the axial direction of the pinion gears 4A and 4B, thus allowing a tilting of the pinion gear 4A and 4B to be suppressed if the pinion gears 4A and 4B are subjected to a force. As a consequence, a biased abrasion of the sliding parts between the pinion gears 4A and 4B and the differential case 2 can be suppressed. Since the side gears 6L and 6R are inserted into the differential case 2 by providing side gear insertion openings 14A and 14B rather than inserting them through the pinion gear receiving openings 12A and 12B as occurs in the prior art arrangement, it is possible to increase the size of the side gears 6L and 6R in comparison to the pinion gears 4A and 4B. In particular, it is possible to increase the number of teeth by a factor of 2.5 or greater as compared with the pinion gears 4A and 4B, allowing the backlash to be reduced. As a result of a reduced size of the pinion gears 4A and 4B, a clearance with respect to the pinion gear holding surfaces on the differential case 2 can be reduced, enabling a further reduction of the backlash. In the present embodiment, the pinion gears 4A and 4B are directly supported by the pinion gear receiving openings 12A and 12B in the differential case 2 without providing a pinion shaft as occurs in the prior art arrangement, and accordingly, the size of the pinion gears 4A and 4B can be reduced and the spacing between the pair of side gears 6L and 6R can also be reduced. As a consequence, a reduction in the size as measured in the direction of the axles is enabled together with a reduction in the weight.

The locking ring 18 which is fitted around the outer periphery of the differential case 2 prevents the pinion gears 4A and 4B from being removed from the differential case 2, thus reducing the number of parts to allow a reduction in the cost required. The locking ring 18 has a spherical surface at its sliding surface with respect to the pinion gears 4A and 4B, and accordingly, if the pinion gears 4A and 4B are displaced as a result of a force applied, the center-to-center distance remains unchanged, enabling a displacement in the meshing position to be reduced. As a result of reducing the size of the pinion gears 4A and 4B, the peripheral speed of sliding parts with respect to the pinion gear holding surfaces of the differential case 2 is reduced, thus improving the seizure resistance. A reduction in the weight of the pinion gears 4A and 4B reduces the influence of the centrifugal force, reducing a variation in the differential action limiting force to improve the performance. If an arrangement is made such that the extensions 12A*b* and 12B*b* of the pinion gear holding surfaces support at least part of the meshing portions 4A*a* and 4B*a* of the pinion gears 4A and 4B, a tilting of the pinion gears 4A and 4B can be suppressed, and in addition, a tilting of the pinion gears 4A and 4B can be suppressed in a more reliable manner by supporting a region including a center of meshing parts where a highest force acts during the torque transmission from the pinion gears to the side gears. Furthermore, the entire meshing portions may be supported by the pinion gear holding surfaces. The differential gearing for vehicle 1 is not limited in its use to providing a differential action between left and right wheels of a vehicle by being disposed therebetween, but is also applicable to providing a differential action between front and rear wheels of a four wheel drive vehicle.

Embodiment 2

FIGS. 9 and 10 show a differential gearing for vehicle 101 according to a second embodiment. FIG. 9 is a longitudinal section corresponding to FIG. 2 for the first embodiment, and FIG. 10 is a cross section corresponding to FIG. 4 for the first embodiment. The differential gearing 101 represents a four pinion type in which four pinion gears mesh with both side gears.

The differential gearing 101 of this embodiment includes a differential case 102 which is of a two-piece construction, including a disk-shaped first case (cap) 102A and a cup-shaped second case 102B which are disposed in abutment against each other and secure together by bolts, not shown. A pair of left and right side gears 106L and 106R and four pinion gears 104A, 104B, 104C and 104D which simultaneously mesh with the both side gears 106L and 106R are disposed within the differential case 102. The four pinion gears 104A, 104B, 104C and 104D are disposed at symmetrical positions with respect to the axis of rotations O1, with a set of two gears disposed adjacent to each other as shown in FIG. 10

To assemble the differential gearing 101 of this embodiment, the pair of side gears 106L and 106R and the thrust washers 116L and 116R are assembled into the cup-shaped, second case 102B starting with members which are located rightmost as viewed in FIG. 9, and then the second case 102B and the first case 102A are fastened together by bolts. The pinion gears 104A, 104B 104C and 104D are inserted into four pinion gear receiving openings 112A, 112B, 112C and 112D, respectively, which are formed in the differential case 102, and then a locking ring 118 is fitted therearound to prevent the pinion gear 104A, 104B, 104C and 104D from being removed. The construction of other parts remains similar to the construction of the first embodiment mentioned above. The differential gearing for vehicle according to the second embodiment operates in the similar manner as the first embodiment, achieving a similar functioning and effects. While a cost saving is achieved in the first embodiment by eliminating the pinion shaft, a greater cost saving effect is achieved in the four pinion type arrangement.

Embodiment 3

FIGS. 11 and 12 show a differential gearing for vehicle 201 according to a third embodiment. FIG. 11 is a longitudinal section corresponding to FIG. 2 for the first embodiment, and FIG. 12 is a cross section corresponding to FIG. 4 for the first embodiment. The differential gearing 201 is of a six pinion type in which six pinion gears are disposed on a circle for meshing engagement with both side gears.

The differential gearing 201 of this embodiment includes a differential case 202 which is of a three-piece construction, including a disk-shaped first case (first cap) 202A which is disposed leftmost as viewed in FIG. 11, a disk-shaped, second case (second cap) 202B located rightmost and a substantially cylindrical third case 202C which is disposed between the first and the second case, which are disposed in abutment against each other and secured together by bolts. A pair of left and right side gears 206L and 206R, and six pinion gears 204A, 204B, 204C, 204D, 204E and 204F which mesh with the both side gears 206L and 206R are disposed within the differential case 202. As shown in FIG. 12, the six pinion gears 204A, 204B, 204C, 204D, 204E and 204F are disposed at an equal interval on a circle.

The differential gearing 201 of this embodiment includes the differential case 202 which is of a three-piece construction, allowing an assembling operation from the both sides. After assembling the side gears 206L and 206R and the thrust washers 216L and 216R from the opposite sides, the first cap 202A and the second cap 202B are secured to the centrally located third case 202C, and the pinion gears 204A, 204B, 204C, 204D, 204E and 204F are inserted, followed by mounting a locking ring 218. In other respects, the arrangement is similar to the arrangement of the first and the second embodiment described above. The differential gearing for vehicle 201 according to the third embodiment operates in the similar manner as each of the embodiments described above with the similar functioning and effects. As the number of the pinion gears increases in this manner, a cost saving effect attributable to the elimination of the pinion shaft is enhanced.

Embodiment 4

FIG. 13 shows a differential gearing for vehicle 301 according to a fourth embodiment, which is of an 8 pinion type in which eight pinion gears are disposed on a circle in meshing engagement with both side gears.

In the differential gearing 301 according to this embodiment, pinion gears 304A, 304B, 304C, 304D, 304E, 304F, 304G and 304H and side gears 306L (the other side gear being omitted from illustration) are contained in a differential case 302 which is constructed to be a three-piece construction in the similar manner as in the third embodiment of six pinion type (see FIG. 12). A locking ring 318 is fitted around the outer periphery of the pinion gears 304A, 304B, 304C, 304D, 304E, 304F, 304G and 304 H. Except for a difference in the number of the pinion gears, this embodiment is similar in arrangement to the third embodiment, and operates in the similar manner with similar functioning and effects.

Embodiment 5

In each embodiment described above, the outer surface of the pinion gear 4 located toward a portion thereof which is held (a portion which is held by pinion gear holding surfaces 12A$a$, 12B$a$, 12A$b$, 12B$b$ on the differential case 2) has a straight configuration (extending parallel to axis of the pinion gear 4A) as shown in FIG. 14A (such straight portion being indicated by character 4A$d$). A short tapered portion 4A$e$ is formed toward the inner end which is adjacent to the meshing portion with the side gears 6L and 6R. The pinion gear 4A is formed with a tooth 4A$f$ over the entire axial direction (vertical direction as viewed in FIG. 14A), and is configured such that the tooth 4A$f$ and the tooth space 4A$g$ alternate in the straight portion 4A$d$ located toward the portion being held. Accordingly, during the rotation of the pinion gear 4A, only a top land 4A$h$ of the pinion gear 4A (or the tooth crest of each tooth 4A$f$ of the pinion gear 4A) is held by the pinion gear holding surfaces 12A$a$, 12B$a$, 12A$b$ and 12B$b$ on the differential case 2.

Figure 14B:
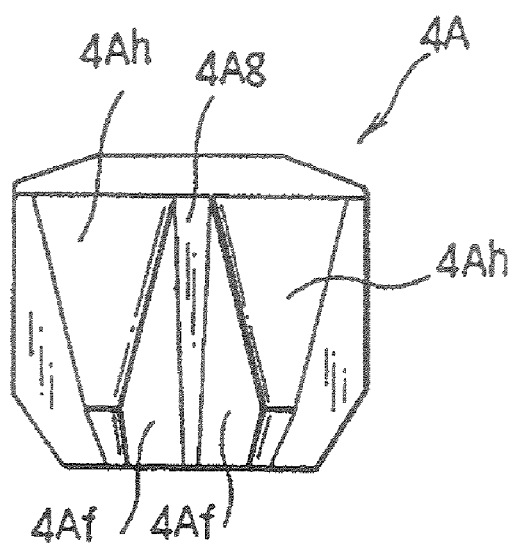

In this arrangement, the portion of the pinion gear 4A which is held by the pinion gear holding surfaces 12A$a$, 12A$b$, 12B$a$ and 12B$b$ on the differential case 2 is only the top land 4A$h$, and because the area over which the holding action applies is reduced, an increased surface pressure results, and thus this arrangement leaves much to be improved in respect of the abrasion and the seizure. In addition, the tooth space 4A$g$ is formed over the entire portion which is held, and because each top land 4A$h$ includes corners, there is a possibility that a corner abutment may occur depending on the configuration of corners to increase the surface pressure furthermore at the corners. In addition, the portion of the pinion gear 4A which is held does not represent a surface which is continuous over the full perimeter, but includes the top land 4A$h$ and the tooth space 4A$g$ in alternate fashion, whereby a configuration as viewed in the circumferential direction appears like a polygonal configuration, presenting a likelihood that the position where the pinion gear 4 is held varies depending on the phase of the pinion gear 4A. Specifically, as shown in FIGS. 14A and 14B, when the phase of the pinion gear 4A is different, the portion of the pinion gear 4A where it is held varies greatly in position and area, leaving much to be improved in respect of noises and the strength of the gear.

Figure 16A:
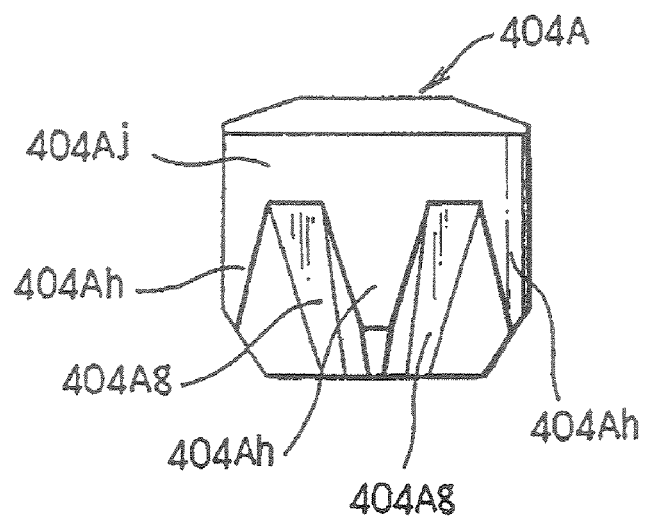
FIGS. 16A and 16B are front views showing pinion gears of the differential gearing for vehicle according the embodiment 5.
Figure 16B:
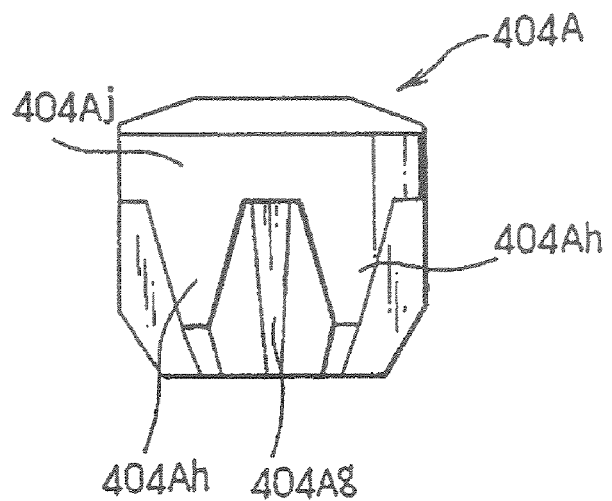

FIG. 15 is a longitudinal section of a differential gearing for vehicle 401 according to a fifth embodiment taken along a plane including the axis of rotation, and FIGS. 16A and 16B show the pinion gears 404A and 404B which are used in this embodiment. (It is to be noted that FIGS. 16A and 16B show only one pinion gear 404A.) Where a tooth is formed over the entire axial length of the pinion gear 4A, problems as discussed above occur, and accordingly, the pinion gears 404A and 404B are improved in their configuration. Except for the configuration of the pinion gears 404A and 404B, the construction is identical with or similar to each embodiment described above, and accordingly a corresponding portion is designated by like reference characters as used in FIG. 2 without repeating their description.

The pinion gears 404A and 404B of this embodiment are formed with held portions 404A$j$ and 404B$j$ in the form of solid cylinders (hereafter referred to as full perimeter held portions) which extend continuously around the full perimeter in a region toward the portion where the pinion gears are held by the pinion gear holding surfaces (or toward the inlet of the pinion gear receiving openings 12A and 12B) and which are disposed out of meshing engagement with the side gears 6L and 6R. The configuration of the pinion gear 404A will be described with reference to FIGS. 16A and 16B. Specifically a portion having a profile in the form of a solid cylinder (full perimeter held portion 404Aj) which is devoid of a tooth space 404Ag is formed by cutting up the dedendum of the region located toward the portion of the pinion gear 404A where it is held (located upward as viewed in FIGS. 16A and 16B) and which are disposed out of meshing engagement with the side gears 6L and 6R. In the pinion gears 404A and 404B of this embodiment, the holding action by the pinion gear holding surfaces on the differential case 2 (the inner peripheral surfaces of the pinion gear receiving openings 12A and 12B and their inward extensions) is applied to the full perimeter held portions 404Aj and 404Bj, and part of the top land 404Ah which continue to the full perimeter held portions 404Aj and 404Bj.

When the pinion gears 404A and 404B are configured in the manner mentioned above, a variation in the position of the portion which is held with the phase of the pinion gears 4A and 4B can be suppressed allowing a good abutment of the meshing portion to be secured and contributing to improving the strength of the gear and reducing noises. For example, for different phases of the pinion gear 404A as illustrated in FIGS. 16A and 16B, an area of the portion of the gear which is held by the pinion gear holding surfaces on the differential case 2 can be secured. As the area of the portion which is held of the pinion gears 404A and 404B is increased, the surface pressure can be reduced, improving the durability and the seizure resistance of the portion which is held. In addition, the full perimeter held portions 404Aj and 404Bj provide a rib effect to the pinion gear, improving the strength of the pinion gears 404A and 404B.

Embodiment 6

FIG. 17 is a longitudinal section of a differential gearing for vehicle 501 according to a sixth embodiment. In each embodiment described above, the side gears 6L and 6R have a tooth end which is defined by a straight line having an inclination, and the gradient is reduced toward the outer periphery (or downward as viewed in FIG. 18). Accordingly, the extension 12Bb (the other being not shown) formed on the pinion gear holding surfaces of the differential case 2 is configured such that a width W1 toward the inlet of the pinion gear receiving opening 12B is greater while a width W2 is reduced gradually inward in order to avoid an interference with the side gears 6L and 6R. The force acting on the pinion gear holding surfaces 12Aa, 12Ba, 12Ab and 12Bb on the differential case 2 tends to be greater inward than outward since the center of the meshing portion is approached when progressing inward. However, with the described arrangement, the width of the pinion gear holding surface becomes thinner inward increasing the surface pressure in such portion, causing problems of abrasion and seizure resistance depending on the condition of use under certain circumstances. In the present embodiment, the configuration of the pinion gear holding surfaces on the differential case 2 is improved in order to overcome this problem. Since parts other than the pinion gear holding surfaces and the configuration of the pair of the side gears are common with the described embodiments, identical or corresponding parts are designated by like reference characters as used in FIG. 2 without repeating their description. FIG. 19 is an enlarged view of pinion gear holding surfaces 512Ba and 512Bb on one side of the present embodiment and a pair of side gears 506L and 506R which mesh with a pinion gear, not shown, which is held by these holding surfaces.

In this embodiment, the tooth height is reduced so that portions 506Lc and 506Rc of teeth located toward the outer periphery of the side gears 506L and 506R run parallel to sliding surfaces 506Ld and 506Rd on the back side of the teeth. Since the side gears 506L and 506R represent bevel gears, the original configuration of the tooth crest should be tapered, gradually lowering toward the end as shown in FIG. 18. However, in this embodiment, the tooth ends of the portions 506Lc and 506Rc toward the outer periphery are located substantially at the same height by gradually lowering the tooth end increasingly from the outer periphery end toward the inner periphery end of the side gears 506L and 506R relative to the original tapered surface (a surface which joins the tooth ends 506Le and 506Re toward the outer periphery, and the tooth ends 506Lf and 506Rf toward the inner periphery). Specifically, the tooth crest cone angle at the outer periphery 506Lc and 506Rc of the side gears 506L and 506R is chosen to be greater than the tooth crest cone angle in a region located gradually inward of the outer periphery 506Lc and 506Rc. By changing the tooth configurations of the side gears 506L and 506R in this manner, a width W3 of the inward extension 512Bb from the pinion gear holding surfaces on the differential case 2 (the inner peripheral surface 512Ba of the pinion gear receiving opening 512B and the extension 512Bb) can be enlarged so as to conform to the tooth end of the outer periphery 506Lc and 506Rc. In this embodiment, the width W3 is substantially equal between the portion of the extension 512Bb located toward the inlet of the pinion gear receiving opening 512B and the distal end extending inwardly of the differential case 2, thereby allowing the area of the pinion gear holding surface to be increased. If it were attempted to enlarge the width W2 of the pinion gear holding surface inward of the differential case 2 while maintaining the tooth configuration of the side gears as shown in FIG. 18, there arises an interference with teeth of the side gears 6L and 6R. However, by changing the tooth configuration of the side gears 506L and 506R in the manner mentioned above, the width W3 of the pinion gear holding surface can be increased inwardly allowing the area of the entire holding surface to be increased.

By increasing of the area of the pinion gear holding surfaces 512Ba and 512Bb in the manner mentioned above, the surface pressure can be reduced and the durability and the seizure resistance of the pinion gear holding surfaces can be improved. If the tooth configuration of the side gears 506L and 506R are changed in the manner shown in FIGS. 17 and 19, there is little change at a location where the tooth face is subject to a force, and accordingly, there is no likelihood of an adverse influence on the meshing engagement with the pinion gears 4A and 4B.

Embodiment 7

By way of example, in a differential gearing for vehicle 601 constructed in a manner shown in FIG. 20, side gears 606L and 606R have sliding surfaces 606Ld and 606Rd on their back surfaces with respect to the differential case 2 which are planar, and the side gears 606L and 606R are slidably supported by thrust washers 16L and 16R which are inserted with respect to sliding surfaces 2Lb and 2Rb on the differential case 2 which are located on their back side. The side gears 606L and 606R are inwardly formed with cylindrical portions (bosses) 606Lb and 606Rb which are formed on their inner surfaces with splines 606La and 606Ra which are coupled to axles, and the outer surfaces of the bosses 606Lb and 606Rb are rotatably passed through axle passing openings 610L and 610R formed in the differential case 2

As mentioned above, on the back side of side gears 606L and 606R, there is a large offset between the sliding surfaces 606Ld and 606Rd and the end faces of the bosses 606Lb and 606Rb. In other words, the bosses 606Lb and 606Rb project for an increased length rearwardly. When the side gears 606L and 606R are configured in this manner, these bosses 606Lb and 606Rb stand in the way to assembling into the differential case 2, and there has been a problem that there is a big restriction in the configuration because of the need to provide an escape for the interfering portions of the differential case 2. In order to avoid an interference of the side gears 606L and 606R relative to the differential case 2 during the assembling operation there remains a problem that either one of sliding surfaces 2Lb and 2Rb of the differential case 2 which support the side gears or the pinion gear holding surfaces (in particular extensions 2Bb) or both must be removed or that the differential case 2 must be split into three pieces rather than one-piece or two-piece configuration.

FIG. 21 is a longitudinal section of a differential gearing for vehicle 701 according to a seventh embodiments which is different in arrangement from previous embodiments in respect of the configuration of side gears 706L and 706R and the configuration of sliding surfaces 702Lb and 702Rb of a differential case 702 which slidably support the side gears 706L and 706R. Only the construction of a different portion will be described while omitting description for the remainder. A pair of side gears 706L and 706R have sliding surfaces 706Ld and 706Rd which are spherical on the rear side (the opposite side from teeth meshing with pinion gear 704A (the other is omitted from illustration)) where they are slidably supported by the differential case 702. The two side gears 706L and 706R are disposed so that tooth faces are located opposite to each other, and the spherical surfaces 706Ld and 706Rd on the back side have a coincident center O7. In other words, the spherical surfaces on the left and right side gears 706L and 706R have the same center O7.

On the other hands supports (sliding portions) 702Lb and 702Rb on the differential case 702 which slidably support the side gears 706L and 706R are formed as concave spherical surfaces having substantially matching curvature with the spherical surfaces of the sliding surfaces 706Ld and 706Rd on the side gears 706L and 706R. Thrust washers 716L and 716R which have also spherical surfaces having the same curvature are interposed between the spherical surfaces on the side gears 706L and 706R and the spherical surfaces of the sliding portions 702Ld and 702Rd on the differential case 702.

In this embodiment, when inserting the side gears 706L and 706R into the differential case 702 of one-piece type, one end (the end located downward as viewed in FIG. 22) of each of the side gears 706L and 706R is inserted through a side gear insertion opening 714A (refer FIG. 22) in the differential case 702 in a skewed position in which their teeth are directed downward and then the side gears are turned in directions as indicated by arrows for a further insertion while moving the spherical surfaces of the side gears 706L and 706R (the sliding surfaces 706Ld and 706Rd) along the spherical surfaces on the differential case 702 (sliding portions 702Lb and 702Rb). Since the side gears 706L and 706R can be inserted into the differential case 702 while turning them, the need for the provision of an escape recess in the differential case 702 can be reduced. This means that the side gears insertion openings 714A can be reduced in size, thereby allowing the strength of the differential case 702 to be improved. Since it is possible to insert the side gears 706L and 706R without damaging the sliding portions 702Lb and 702Rb on the differential case 702, the seizure resistance and the abrasion strength of these sliding portions 702Lb and 702Rb on the differential case 702 can be improved. In addition, the wall thickness of the side gears 706L and 706R in a region where the splines 706La and 706Ra are formed can be increased, allowing the strength of the side gears 706L and 706R to be improved. Finally, the side gears 706L and 706R may move within a preset range of clearances, but if they move, they move in a circumferential direction, allowing a defective tooth abutment to be minimized, and this improves the strength of the gears.

Embodiment 8

It will be appreciated from FIGS. 23 and 24 that in each embodiment described above, a pinion gear holding surface on a differential case 802 comprises inner peripheral surfaces 812Aa and 812Ba of pinion gear receiving opening 812A and 812B, and inward extensions 812Ab and 812Bb to increase the area of portions where pinion gears 804A and 804B are held, thereby allowing the rotating pinion gears 804A and 804B to be held in a stabilized manner and improving the performance of their meshing engagement with the side gears 806L and 806R. However, there remains a problem that the provision of inward extensions 812Ab and 812Bb directly on the differential case 802 may stand in the way to assembling the side gears 806L and 806R, in particular, for the differential case 802 of one-piece type. For example, when side gear insertion openings 814A and 814B are formed which are of a length slightly greater than the diameter of the side gears 806L and 806R in a side of one-piece differential case 802 in order to insert the side gears 806L and 806R, the presence of the extensions 812Ab and 812Bb of the pinion gear holding surface which project inwardly obstructs the insertion of the side gears 806L and 806R, presenting a problem that such insertion is very difficult to achieve.

An eighth embodiment is provided in order to overcome this problem. As shown in FIG. 25, in this embodiment, a portion of a differential case 902 which is intended to hold pinion gears 904A and 904B comprises separate pinion gear holding members 920A and 920B. In this embodiment, the differential case 902 has openings 912A and 912B, which are circular openings greater than the external diameter of pinion gears 904A and 904B, and the differential case 902 itself is free from any inward extension. Cylindrical pinion gear holding members 920A and 920B each having an external diameter which substantially matches the internal diameter of the opening 912A or 912B and an internal diameter which substantially matches the external diameter of the pinion gear 904A or 904B are provided anew. The pinion gear holding members 920A and 920B are designed such that when their outer end face is aligned substantially with the external surface of the differential case 902 when inserted within the opening 912A and 912B, the inner end face projects inwardly of the openings 912A and 912B. The internal surfaces of such projecting portions 920Aa and 920Ba function in the same manner as the extensions (refer 812Bb shown in FIG. 23) in the described embodiments. It is preferred that these projecting portions 920Aa and 920Ba project through a length which is substantially equal to the length of the extensions 812Ab and 812Bb of the pinion gear holding surface, but may be shorter or longer than this.

In this embodiment, when assembling into the differential case 902 of one-piece type, the side gears, not shown, are inserted through the side gear insertion openings 914A and 914B shown in FIG. 26 in directions indicated by arrows before the pinion gears 904A and 904B and the pinion gear holding members 920A and 920B are assembled. At this point in time, since the pinion gear holding members 920A and 920B are not mounted in place as yet, there is no obstruction to the insertion of the side gears, and the side gears can be easily inserted. After the side gears have been inserted, the pinion gear holding members 920A and 920B and the pinion gears 904A and 904B are inserted in directions indicated by arrows shown in FIG. 25, then securing the pinion gear holding members 920A and 920B.

When it becomes possible to insert the side gears smoothly, there is no need to provide escape recesses 8*a* (refer FIGS. 2 and 8) within the differential case 2 as mentioned previously in connection with the first embodiment, there is no configurational restraint to enhance the freedom of design, resulting in an improvement of the strength of the differential case 902. Portions which act to hold the pinion gears are subject to a high load during the operation, but if the entire differential case is subject to a heat treatment and/or a surface treatment, an increase in the cost results. However, when using the pinion gear holding members 920A and 920B which are separate members, an optimum heat treatment and/or surface treatment can be applied to only these members, thus improving the durability and seizure resistance of portions which act to hold the pinion gears while reducing the cost required for the differential case 902. In addition, because the configuration of portions of the differential case 902 which act to hold the pinion gears (or the configuration of the openings 912A and 912B) can be simplified, the influence of the strains caused by the heat treatment can be reduced and the accuracy can be improved. Because the pinion gear holding members 920A and 920B can not be an obstruction to the insertion of the side gears, the pinion gear holding surface can be increased in length, allowing a tilting of the pinion gears 904A and 904B to be suppressed in a more reliable manner as compared with the previous embodiments.

Embodiment 9

The pinion gear which has been used in each embodiment described above includes a portion which is held by the pinion gear holding surface on the differential case and having an outer surface of a straight configuration (running parallel to the axis of the pinion gear) while a meshing portion with the side gear is configured to be with a short tapered portion toward an inner end (refer straight portion 4A*d* and tapered portion 4A*e* shown in FIG. 14A). In the example shown in FIGS. 14A and 14B, the straight portion 4A*d* represents on the order of ¾ of the total length of the pinion gear 4A while the remaining ¼ represents the tapered portion 4A*e*. In an arrangement using such pinion gears, only a straight portion 1004*d* is held by a pinion gear holding surface 1012*a* which is internally formed on a differential case 1002, as shown in FIG. 27. It should be understood that the ratio between the straight portion 1004*d* and the tapered portion 1004*e* of the pinion gear 1004 is not limited to the value mentioned above. However, it is preferred the tapered portion 1004*e* be equal to or less than ⅓ of the total length of the pinion gear 1004.

In an arrangement as shown in FIG. 27 in which only the straight portion 1004*d* is held by the pinion gear holding surface 1012*a* of the differential case 1002, the surface pressure rises to a high value around a location where the tooth face of the pinion gear 1004 is subjected to a force, leaving much to be improved in respect of the durability and the seizure resistance FIG. 27 is a cross section of a differential gearing 1001 of six-piece type including six pinion gears 1004 taken along a plane including the axes of each pinion gear 1004 in a manner corresponding to FIG. 12.

This problem is overcome by a differential gearing for vehicle 1101 according to a ninth embodiment shown in FIG. 28, which illustrates a pinion gear holding surface 1112*a* of a differential case 1102 which is further enlarged inwardly. In this embodiment, a pinion gear holding surface 1112*a* which is similar to the one shown in the previous embodiment holds a straight portion 1104*d* of the pinion gear 1104 while simultaneously allowing a tapered surface 1104*e* on the pinion gear 1104 which is located toward the inner end to be also held by an extension 1112*b* which is inwardly enlarged. When the pinion gear 1104 is held in this manner up to its inner end, the surface pressure applied to the pinion gear 1104 can be dispersed, allowing the durability and the seizure resistance to be improved. When the pinion gear 1104 is held up to its innermost end, there is obtained a tilting preventing effect, allowing a normal meshing engagement to be maintained and thus the strength of the gear to be improved.

Embodiment 10

A tenth embodiment further improves the seventh embodiment mentioned above, reducing the side gear insertion opening in the differential case to improve the rigidity of the differential case. FIG. 29 is a longitudinal section of a differential gearing for vehicle 1201 according to the tenth embodiment, and in this embodiment, the size and the locations of the side gear insertion openings 1204L and 1204R which are used in order to insert side gears 1206L and 1206R into the differential case 1202 are different from the arrangement of the embodiment 7. Only a difference over the previous arrangement will be described while omitting a description for the remainder.

The side gear insertion openings 1204L and 1204R of the present embodiment are disposed at positions which are 180° symmetrical with respect to the axis of rotation of the differential case 1202 and have a size which is smaller than the side gear insertion opening 714A (refer FIG. 22) of the embodiment 7. When inserting the side gears 1206L and 1206R into the differential case 1202, the side gear 1206L is inserted into the side gear insertion opening 1204L at the same time as the side gear 1206R is inserted into the side gear insertion opening 1204R. After the both side gears have been received within the differential case 1202, the both side gears are simultaneously rotated in directions indicated by arrows to align the axes of the both side gears with the axis of rotation of the differential case 1202. Subsequently, thrust washers 1216L and 1216R are inserted between the back sides of the both side gears and spherical surfaces 1206L*d* and 1206R*d*. It is to be noted that while not shown, extensions from the pinion gear holding surface are located at positions which are phase displaced by 90° in the direction of the rotation of the differential case 1202 from the side gear insertion openings 1204L and 1204R.

As a result of such an arrangement, it is possible to insert the both side gears through the side gear insertion openings which are relatively small while avoiding an interference between the side gears and the extensions from the pinion gear holding surface, thus allowing a reduction in the rigidity of the differential case which may be caused by the provision of the side gear insertion openings to be suppressed. Since the side gear insertion openings 1204L and 1204R are disposed at positions which are 180° symmetrical with respect to the axis of rotation of the differential case 1202, the occurrence of oscillations which may be caused by an unbalanced rotation can be reduced. When the thrust washers 1216L and 1216R are inserted behind the both side gears which are already inserted, the both side gears are positioned closer to each other by an amount corresponding to the thicknesses of the thrust washers 1216L and 1216R, thus allowing the size of the side gear insertion openings 1204L and 1204R to be reduced. In other words, when the both side gears are inserted, a space within the differential case 1202 which is by an amount corresponding to the thicknesses of the thrust washers 1216L and 1216R greater to be secured, increasing the freedom of the positioning of the both side gears, and enabling the both side gears to be inserted through smaller side gear insertion openings.

In order to adjust a meshing engagement between the both side gears and the pinion gears, configuration of the both side gears and configuration of the differential case 1202 may be measured before the side gears 1206L and 1206R are assembled, and the thicknesses of the thrust washers 1216L and 1216R may be changed to correct for any machining error of these members on the basis of results of such measurements. For example, several kinds of thrust washers having different thicknesses may be provided, and in the event the axial length of the side gear 1206L is less than a standard value, a thrust washer 1216L having a greater thickness may be chosen. In this manner, a machining error of the side gear 1206L can be corrected for, securing a good meshing engagement with the pinion gear. In addition, as shown in FIG. 30, a thrust washer 1214 may be interposed between a pinion gear 1212 and a locking ring 1213 to adjust the meshing engagement between the gears by changing the thickness of the thrust washer 1214, thus achieving a similar effect. In addition, by combining an adjustment through changing the thicknesses of thrust washers 1216L and 1216R and an adjustment through changing the thickness of the thrust washer 1214, a more favorable meshing engagement can be achieved between the both side gears and the pinion gears.

It should be understood that an adjustment of the meshing engagement between the both side gears and the pinion gears by changing the thicknesses of the thrust washers is also applicable to each embodiment described above. The achievement of a good meshing engagement between the both side gears and the pinion gears is particularly an essential task in the differential gearing according to the present invention in which the differential action limiting action is achieved by supporting the pinion gears with the pinion gear supporting surfaces. This is because an appropriate differential action limiting force can not be exercised if the pinion gears are not in sliding contact with pinion gear supporting surfaces with a high precision.

It is desirable that a surface machining or a surface treatment be applied to the tooth crest of each pinion gear 4A and 4B (or other pinions of other embodiments) and/or the pinion gear holding surfaces which are disposed in sliding contact with such tooth crest in order to reduce an aging change in the frictional resistances between these surfaces. By way of example, at least one of these surfaces may be formed with a number of fine recesses in a non-uniform condition (or non-uniformly random condition) or these surfaces may be subject to a shot peening operation after they have been machined. Alternatively, shaped surfaces of the pinion gears 4A and 4B as formed by a cutting operation before they are shaped into gears may be directly used. In the conventional gear, a finish machining is applied to the shaped surface to provide a smooth surface, but when the shaped surface is directly used, there is no need for the finish machining, thus reducing a number of steps to reduce the cost required. In addition, after a configuration having non-uniform recesses is obtained by a hobbing operation or the like, only the surface thereof may be smoothly finished (as by lapping operation). In this instance, the surface is subject to a finishing operation only through a slight thickness, thus leaving recesses within the tooth faces. By applying such surface machining, the recesses can be left intact even though the surface layer of the sliding surface is abraded, allowing a lubrication to be secured. In addition, a coating may be applied to the sliding surfaces of the pinion gears 4A and 4B and the pinion gear holding surface.

The invention claimed is:

1. A differential gearing for a vehicle, comprising:
   a plurality of pinion gears that are rotatably carried within pinion gear receiving openings formed in a differential case and supported in the differential case in the absence of a pinion shaft; and
   a pair of side gears disposed in meshing engagement with the pinion gears and connected to a pair of axles, wherein the pinion gears are in meshing engagement with the side gears at a meshing portion of the pinion gears;
   in which the differential case includes a pinion gear holding surface disposed in sliding contact with each pinion gear received within the pinion gear receiving openings, each pinion gear holding surface including an inward extension extending inward into the differential case in a direction generally parallel to the axis of each respective pinion gear for supporting at least part of a meshing portion of each respective pinion gear that is in meshing engagement with a respective one of the side gears at a location overlapping with the meshing portion of the pinion gears in the direction generally parallel to the axis of each respective pinion gear.

2. The differential gearing for a vehicle according to claim 1 in which each pinion gear is held within the differential case by the respective pinion gear holding surface of the pinion gear receiving opening and a pinion gear locking ring fitted around the pinion gear receiving opening.

3. The differential gearing for a vehicle according to claim 2 in which each side gear has a number of teeth equal to or greater than 2.5 times the number of teeth of the meshing pinion gear.

4. The differential gearing for a vehicle according to claim 2, further comprising a thrust washer interposed between the locking ring for the pinion gear and the pinion gear for adjusting a meshing engagement between each pinion gear and the respective side gear.

5. The differential gearing for a vehicle according to claim 1 in which the differential case includes a side gear insertion opening in a region where the pinion gear receiving opening is not provided.

6. The differential gearing for a vehicle according to claim 5 in which each side gear includes a sliding surface on its back surface that is shaped to be spherical, and the differential case has a surface that supports the respective side gear and that is formed as a spherical surface having a substantially matching curvature with the sliding surface of the respective side gear.

7. The differential gearing for a vehicle according to claim 1 in which each pinion gear includes a portion disposed in sliding contact with the respective pinion gear holding surface and formed with an outer peripheral surface in a form of a solid cylinder that extends continuously around the full perimeter thereof in a region other than the meshing portion.

8. The differential gearing for a vehicle according to claim 7 in which each pinion gear is formed with a straight portion of the same diameter as the outer peripheral surface in a form of a solid cylinder inclusive of the meshing portion that is disposed in meshing engagement with one of the side gears, thus allowing the outer peripheral surface in the form of a solid cylinder and at least part of the straight portion to be held by the pinion gear holding surface of the respective pinion gear receiving opening.

9. The differential gearing for a vehicle according to claim 1 in which each side gear includes a tooth crest cone angle at the outer periphery that is greater than a tooth crest cone angle at a location inward of the outer periphery, and the inward extension of each pinion gear holding surface is configured in conformity to the tooth crest around the outer periphery of the respective side gear.

10. The differential gearing for a vehicle according to claim 1, further comprising a thrust washer disposed between a spherical sliding surface of each side gear and a supporting surface of the differential case that supports the respective sliding surface for adjusting a meshing engagement between the side gear and the respective pinion gear.

11. A differential gearing for a vehicle, comprising:
- a pair of side gears connected to a pair of axles, respectively;
- a plurality of pinion gears disposed in meshing engagement with the side gears at right angles, wherein the pinion gears are in meshing engagement with the side gears at a meshing portion of the pinion gears;
- a differential case for containing the pair of side gears and the plurality of pinion gears, wherein the pinion gears are supported in the differential case in the absence of a pinion shaft;
- a pinion gear holding member formed with a pinion gear holding surface that supports at least part of a meshing portion of each pinion gear disposed in meshing engagement with a respective one of the side gear, the pinion gear holding surface extending inward of the differential case in a direction generally parallel to the axis of each respective pinion gear at an axial position of each pinion gear overlapping with the meshing portion of the pinion gears in the direction generally parallel to the axis of the respective pinion gear,
- an arrangement being such that the pinion gears and the pinion gear holding members can be assembled into the differential case after the pair of side gears have been inserted into the differential case.

12. The differential gearing for a vehicle according to claim 11 in which each pinion gear holding member is inserted into the differential case through an opening formed at a location which corresponds to an assembled position of the respective pinion gear in the differential case.

13. A differential gearing for a vehicle, comprising:
- a plurality of pinion gears that are rotatably carried in pinion gear receiving openings formed in a differential case and supported in the differential case in the absence of a pinion shaft; and
- a pair of left and right side gears disposed in meshing engagement with the pinion gears and connected to left and right axles, respectively, wherein the pinion gears are in meshing engagement with the side gears at a meshing portion of the pinion gears;
- in which the outer surface of each pinion gear comprises a straight portion formed toward an inlet of each respective pinion gear receiving opening, and a tapered portion formed toward an inner end;
- a pinion gear holding surface of each respective pinion gear receiving opening disposed in sliding contact with each respective pinion gear and extending inward of the differential case to an axial position of each pinion gear overlapping with the meshing portion of the pinion gears in a direction generally parallel to the axis of each respective pinion gear, such extension being effective to hold the straight portion and the tapered portion.

* * * * *